United States Patent
Cai et al.

(10) Patent No.: US 11,928,349 B2
(45) Date of Patent: Mar. 12, 2024

(54) ACCESS CONTROL CONFIGURATIONS FOR SHARED MEMORY

(71) Applicant: QUALCOMM Incorporated, San Diego, CA (US)

(72) Inventors: Liang Cai, San Diego, CA (US); Qing Li, San Diego, CA (US); Giorgi Maisuradze, Berlin (DE); Hemang Lotlikar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 249 days.

(21) Appl. No.: 17/517,331

(22) Filed: Nov. 2, 2021

(65) Prior Publication Data

US 2022/0342573 A1 Oct. 27, 2022

Related U.S. Application Data

(63) Continuation-in-part of application No. 17/239,012, filed on Apr. 23, 2021, now Pat. No. 11,630,711.

(51) Int. Cl.
*G06F 3/06* (2006.01)

(52) U.S. Cl.
CPC .......... *G06F 3/0637* (2013.01); *G06F 3/0604* (2013.01); *G06F 3/0631* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 8,208,914 B1 * | 6/2012 | Sunder | H04L 67/125 |
| | | | 455/420 |
| 2012/0110303 A1 * | 5/2012 | Dhanwada | G06F 15/17325 |
| | | | 712/31 |
| 2013/0326180 A1 | 12/2013 | Mamidala et al. | |
| 2014/0044265 A1 | 2/2014 | Kocher et al. | |
| 2015/0052267 A1 * | 2/2015 | Egi | G06F 13/28 |
| | | | 710/22 |
| 2015/0192414 A1 * | 7/2015 | Das | G01C 5/06 |
| | | | 73/384 |
| 2017/0220478 A1 * | 8/2017 | Saidi | G06F 12/0891 |
| 2021/0152673 A1 * | 5/2021 | Patil | H04L 69/22 |
| 2022/0342729 A1 | 10/2022 | Cai | |

* cited by examiner

*Primary Examiner* — Craig C Dorais
(74) *Attorney, Agent, or Firm* — Holland & Hart LLP

(57) ABSTRACT

Methods, systems, and devices for access control configurations for inter-processor communications are described to support reconfiguration of a dynamic access control configuration at a device. The configuration may support additional configuration fields that may be added to existing access control rules of the device. A processor of the device may request creation of a new shared memory resource, using a subregion of an existing memory resource, where the additional fields may indicate a parent memory resource for the new memory resource. The additional fields may also include a value which may indicate a processor which has write permission for a respective memory region of the shared memory, where other processors of the device may be prevented from writing to the memory region. The additional fields may further indicate a chain of delegation, or a history, of which processors have been assigned the exclusive write permission for the respective memory region.

20 Claims, 19 Drawing Sheets

ACCESS CONTROL CONFIGURATIONS FOR SHARED MEMORY

CROSS REFERENCE

The present application for patent is a Continuation In-Part of U.S. patent application Ser. No. 17/239,012 by CAI, entitled "ACCESS CONTROL CONFIGURATIONS FOR INTER-PROCESSOR COMMUNICATIONS," filed Apr. 23, 2021, assigned to the assignee hereof, and expressly incorporated by reference in its entirety herein.

FIELD OF TECHNOLOGY

The following relates to shared memory, including access control configurations for shared memory.

BACKGROUND

Communications systems are widely deployed to provide various types of information. These systems may be capable of communication, processing, storage, and generation of information. Examples of communications systems include entertainment systems, information systems, virtual reality systems, model and simulation systems, and so on. These systems may employ a combination of hardware and software technologies to support processing, storage, and generation of the information, for example, such as devices, storage devices, communication networks, computer systems, and display devices. Some security configurations implemented for communications between processors of a device (e.g., using a shared memory) may increase device complexity and power usage at the device.

SUMMARY

The described techniques relate to improved methods, systems, devices, and apparatuses that support access control configurations for shared memory. Generally, the described techniques provide for improved reconfiguration of a dynamic access control configuration at a device. For example, additional configuration fields may be added to existing access control rules of the device, where these additional fields may be configured by a processor (e.g., sub-system) sending information to a receiving processor, via a shared memory resource or region of the device. The additional fields may in some examples include a value that may specify a processor that has exclusive write permission for a memory resource (e.g., memory region) of the shared memory. This value may indicate the sending processor of the memory resource, and the value may be set by access control hardware when the additional field is changed. Other processors of the device may be prevented from writing to the memory resource.

In some cases, a processor of the device may request creation of a new shared memory resource, using a sub-region of an existing memory resource. In such cases, the additional fields may indicate a parent memory resource used to create the new memory resource. The additional fields may further indicate a chain of delegation, or a history, of which processors have been assigned the exclusive write permission for a respective memory region.

A method for managing access control at a shared memory of a device is described. The method may include determining a configuration for a memory component of the device, the configuration indicating a set of multiple processors that share the memory component and indicating one or more permissions for a memory resource of the memory component, assigning, to a first processor of the set of multiple processors, a permission to write to the memory resource based on the configuration, writing first information to the memory resource by the first processor based on the assigned permission to the first processor, and preventing a second processor of the set of multiple processors and a remainder of the set of multiple processors from writing to the memory resource based on the assigned permission to the first processor.

An apparatus for managing access control at a shared memory of a device is described. The apparatus may include a plurality of processors, memory coupled with each of the plurality of processors, and instructions stored in the memory and executable by the plurality of processors to cause the apparatus to determine a configuration for a memory component of the device, the configuration indicating a set of multiple processors that share the memory component and indicating one or more permissions for a memory resource of the memory component, assign, to a first processor of the set of multiple processors, a permission to write to the memory resource based on the configuration, write first information to the memory resource by the first processor based on the assigned permission to the first processor, and prevent a second processor of the set of multiple processors and a remainder of the set of multiple processors from writing to the memory resource based on the assigned permission to the first processor.

Another apparatus for managing access control at a shared memory of a device is described. The apparatus may include means for determining a configuration for a memory component of the device, the configuration indicating a set of multiple processors that share the memory component and indicating one or more permissions for a memory resource of the memory component, means for assigning, to a first processor of the set of multiple processors, a permission to write to the memory resource based on the configuration, means for writing first information to the memory resource by the first processor based on the assigned permission to the first processor, and means for preventing a second processor of the set of multiple processors and a remainder of the set of multiple processors from writing to the memory resource based on the assigned permission to the first processor.

A non-transitory computer-readable medium storing code for managing access control at a shared memory of a device is described. The code may include instructions executable by a processor to determine a configuration for a memory component of the device, the configuration indicating a set of multiple processors that share the memory component and indicating one or more permissions for a memory resource of the memory component, assign, to a first processor of the set of multiple processors, a permission to write to the memory resource based on the configuration, write first information to the memory resource by the first processor based on the assigned permission to the first processor, and prevent a second processor of the set of multiple processors and a remainder of the set of multiple processors from writing to the memory resource based on the assigned permission to the first processor.

Some examples of the method, apparatuses, and non-transitory computer-readable medium described herein may further include operations, features, means, or instructions for reading the first information from the memory resource by the second processor based on writing the first information to the memory resource by the first processor.

Some examples of the method, apparatuses, and non-transitory computer-readable medium described herein may further include operations, features, means, or instructions for determining a validity of the first information by the second processor based on the reading of the first information from the memory resource by the second processor.

In some examples of the method, apparatuses, and non-transitory computer-readable medium described herein, reading the first information may include operations, features, means, or instructions for reading, by the second processor, a value indicative of the permission from a field of a table associated with the configuration, where the field corresponds to the memory resource.

Some examples of the method, apparatuses, and non-transitory computer-readable medium described herein may further include operations, features, means, or instructions for assigning, to the second processor, the permission to write to the memory resource based on writing the first information to the memory resource by the first processor and preventing the first processor and the remainder of the set of multiple processors from writing to the memory resource based on the assigned permission to the second processor.

Some examples of the method, apparatuses, and non-transitory computer-readable medium described herein may further include operations, features, means, or instructions for writing, to the memory resource and by the second processor, second information in response to the first information based on the assigned permission to the second processor.

Some examples of the method, apparatuses, and non-transitory computer-readable medium described herein may further include operations, features, means, or instructions for assigning, to the first processor by the second processor, the permission to write to the memory resource based on writing the second information and preventing the second processor and the remainder of the set of multiple processors from writing to the memory resource based on the assigned permission to the first processor.

In some examples of the method, apparatuses, and non-transitory computer-readable medium described herein, assigning the permission to the second processor may include operations, features, means, or instructions for writing, by the first processor, a value indicative of the permission to a field of a table associated with the configuration, where the field corresponds to the memory resource.

In some examples of the method, apparatuses, and non-transitory computer-readable medium described herein, the table includes a set of multiple rows, each row corresponding to a respective memory resource and including a set of parameters indicative of the respective memory resource within the memory component.

Some examples of the method, apparatuses, and non-transitory computer-readable medium described herein may further include operations, features, means, or instructions for writing the value indicative of the permission may be based on the assigned permission to the first processor.

Some examples of the method, apparatuses, and non-transitory computer-readable medium described herein may further include operations, features, means, or instructions for resetting the permission to write to the memory resource, where each of the set of multiple processors may be operable to write to the memory resource based on the reset permission.

Another method for memory management at a device is described. The method may include determining a configuration for a memory component of the device, the configuration indicating a set of multiple processors that share the memory component and indicating one or more permissions for a first memory resource of the memory component, allocating a second memory resource of the memory component by allocating a sub-region of the first memory resource to the second memory resource, assigning, to a first processor of the set of multiple processors, a permission to write to the second memory resource based on allocating the sub-region of the first memory resource to the second memory resource, and preventing a second processor of the set of multiple processors from writing to the second memory resource based on the assigned permission to the first processor.

Another apparatus for memory management at a device is described. The apparatus may include a plurality of processors, memory coupled with each of the plurality of processors, and instructions stored in the memory and executable by the plurality of processors to cause the apparatus to determine a configuration for a memory component of the device, the configuration indicating a set of multiple processors that share the memory component and indicating one or more permissions for a first memory resource of the memory component, allocate a second memory resource of the memory component by allocating a sub-region of the first memory resource to the second memory resource, assign, to a first processor of the set of multiple processors, a permission to write to the second memory resource based on allocating the sub-region of the first memory resource to the second memory resource, and prevent a second processor of the set of multiple processors from writing to the second memory resource based on the assigned permission to the first processor.

Another apparatus for memory management at a device is described. The apparatus may include means for determining a configuration for a memory component of the device, the configuration indicating a set of multiple processors that share the memory component and indicating one or more permissions for a first memory resource of the memory component, means for allocating a second memory resource of the memory component by allocating a sub-region of the first memory resource to the second memory resource, means for assigning, to a first processor of the set of multiple processors, a permission to write to the second memory resource based on allocating the sub-region of the first memory resource to the second memory resource, and means for preventing a second processor of the set of multiple processors from writing to the second memory resource based on the assigned permission to the first processor.

Another non-transitory computer-readable medium storing code for memory management at a device is described. The code may include instructions executable by a processor to determine a configuration for a memory component of the device, the configuration indicating a set of multiple processors that share the memory component and indicating one or more permissions for a first memory resource of the memory component, allocate a second memory resource of the memory component by allocating a sub-region of the first memory resource to the second memory resource, assign, to a first processor of the set of multiple processors, a permission to write to the second memory resource based on allocating the sub-region of the first memory resource to the second memory resource, and prevent a second processor of the set of multiple processors from writing to the second memory resource based on the assigned permission to the first processor.

Some examples of the method, apparatuses, and non-transitory computer-readable medium described herein may further include operations, features, means, or instructions for assigning the first processor to control the configuration of the second memory resource based on allocating the second memory resource.

Some examples of the method, apparatuses, and non-transitory computer-readable medium described herein may further include operations, features, means, or instructions for updating, based on allocating the second memory resource of the memory component, an indication of a chain of delegation associated with the second memory resource to include the second processor, where the second processor may be configured to control the configuration of the first memory resource.

Some examples of the method, apparatuses, and non-transitory computer-readable medium described herein may further include operations, features, means, or instructions for writing first information to the second memory resource by the first processor based on the assigned permission to the first processor.

Some examples of the method, apparatuses, and non-transitory computer-readable medium described herein may further include operations, features, means, or instructions for reading the first information from the second memory resource by the second processor based on writing the first information to the second memory resource by the first processor.

Some examples of the method, apparatuses, and non-transitory computer-readable medium described herein may further include operations, features, means, or instructions for updating, based on allocating the second memory resource of the memory component, a data structure associated with the configuration of the memory component to include a second set of multiple fields associated with the second memory resource, the data structure further including a first set of multiple fields associated with the first memory resource.

Some examples of the method, apparatuses, and non-transitory computer-readable medium described herein may further include operations, features, means, or instructions for reading, by the first processor, a value indicative of the assigned permission to write to the second memory resource from a first field of the second set of multiple fields associated with the second memory resource.

In some examples of the method, apparatuses, and non-transitory computer-readable medium described herein, the second set of multiple fields includes respective fields indicating an address range of the second memory resource, read permissions for the second memory resource, the assigned permission to write to the second memory resource, a parent memory resource for the second memory resource, and a chain of delegation for the second memory resource and the first set of multiple fields includes respective fields indicating an address range of the first memory resource, read permissions for the first memory resource, a permission to write to the first memory resource, and a chain of delegation for the first memory resource.

Some examples of the method, apparatuses, and non-transitory computer-readable medium described herein may further include operations, features, means, or instructions for assigning, to the second processor, the assigned permission to write to the second memory resource and preventing the first processor from writing to the second memory resource based on the assigned permission to the second processor.

Some examples of the method, apparatuses, and non-transitory computer-readable medium described herein may further include operations, features, means, or instructions for updating an indication of a chain of delegation associated with the second memory resource to include the first processor based on the assigned permission to write to the second memory resource to the second processor.

Some examples of the method, apparatuses, and non-transitory computer-readable medium described herein may further include operations, features, means, or instructions for writing, to the second memory resource and by the second processor, second information based on the assigned permission to the second processor.

Some examples of the method, apparatuses, and non-transitory computer-readable medium described herein may further include operations, features, means, or instructions for assigning, by the second processor to a third processor of the set of multiple processors, the assigned permission to write to the second memory resource, preventing the first processor and the second processor from writing to the second memory resource based on the assigned permission to the third processor, and updating an indication of a chain of delegation associated with the second memory resource to indicate the second processor based on the assigned permission to write to the second memory resource to the third processor.

DETAILED DESCRIPTION

Figure 1:
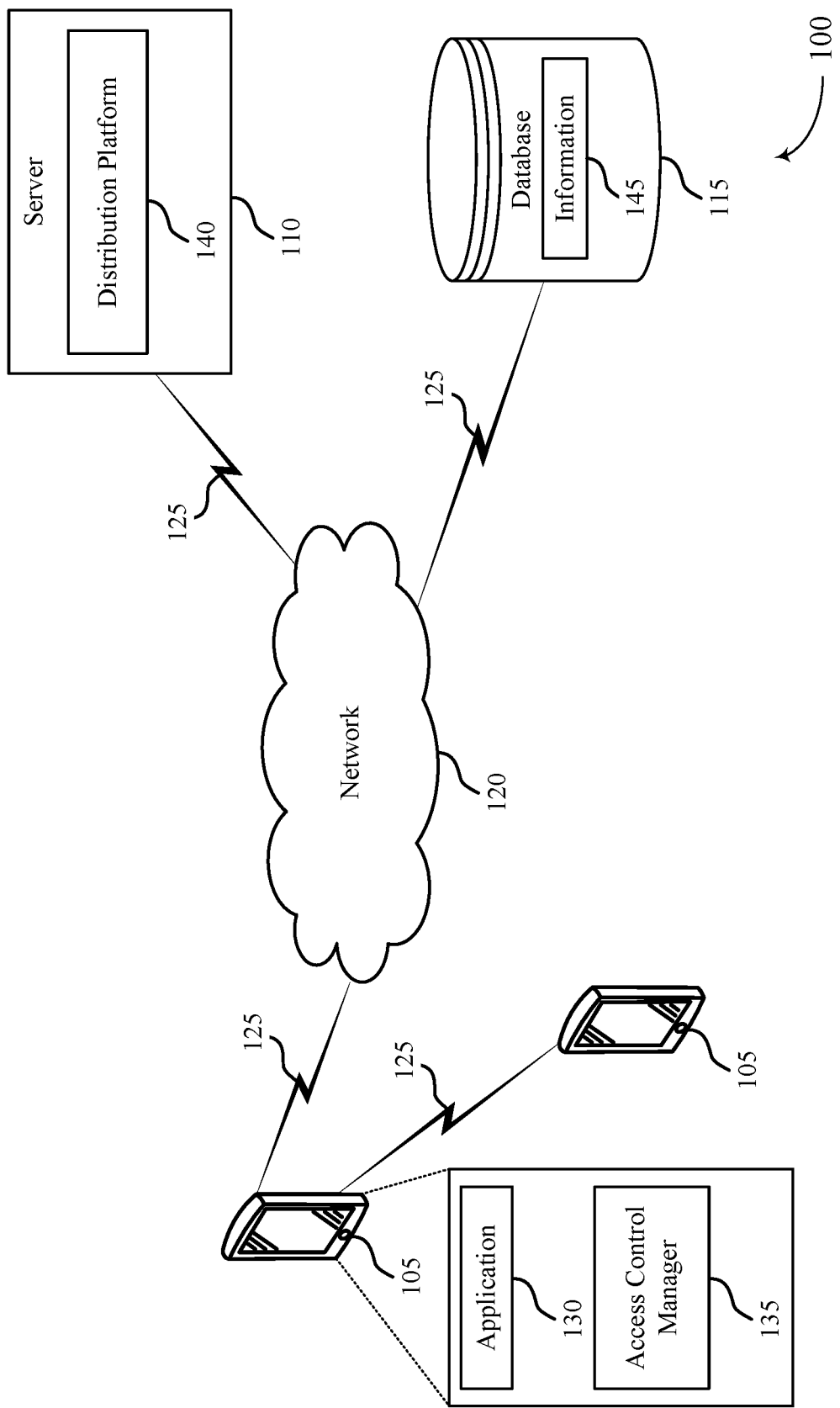
FIG. 1 illustrates an example of a communications system that supports access control configurations for shared memory in accordance with aspects of the present disclosure.

A system-on-chip (SoC) of a device may include multiple processors, which may additionally or alternatively be referred to as sub-systems of the SoC. Applications associated with the SoC (e.g., on the SoC) may move or transfer data among the multiple sub-systems (e.g., processors) of the SoC. The sub-systems may move or transfer data via memory buffers (e.g., shared memory buffers), which may be associated with dynamic access control rules (e.g., an access control configuration) enforced on the buffers (e.g., to provide security). For example, different sub-systems may have different security domains, and may therefore be unable to determine whether to trust information or data originating from another sub-system of the SoC. Accordingly, a security domain (e.g., a higher security domain) that is trusted by all sub-systems using the shared memory buffers may manage the access control configuration. However, using such a security domain for access control reconfiguration may increase power usage and performance overhead at the device (e.g., based on delays due to data movement and validation). In some cases, it may additionally be unfeasible to find a security domain (e.g., the higher, trusted security domain) trusted by multiple sub-systems, to implement the dynamic access control configuration.

The present disclosure provides techniques to support a flexible access control configuration implemented in hardware at the device, where portions of the access control configuration may be managed by individual sub-systems. The flexible access control configuration may also maintain a high security for memory buffer transferring among sub-systems. The configuration may, for example, support additional configuration fields that may be added to existing access control rules of the device. The additional fields may be configured by a first processor (e.g., sub-system) sending information to a second processor (e.g., sub-system), via a shared memory resource or region of the device. In some cases, a processor of the device may request creation of a new shared memory resource, using a sub-region of an existing memory resource. In such cases, the additional fields may indicate a parent memory resource used to create the new memory resource. The additional fields may also include a value which may indicate a processor which has exclusive write permission for a respective memory region of the shared memory, where other processors of the device may be prevented from writing to the memory region. The additional fields may further indicate a chain of delegation, or a history, of which processors have been assigned the exclusive write permission for the respective memory region.

Based on managing the access control configuration among the individual sub-systems, the device may maintain a relatively high level of security for data transfer between sub-systems of the device while reducing complexity, power usage, or overhead, or any combination thereof.

Aspects of the disclosure are initially described in the context of a communications system. Aspects of the disclosure are further illustrated by and described with reference to a device, data structures, a process flow, apparatus diagrams, system diagrams, and flowcharts that relate to access control configurations for shared memory.

FIG. 1 illustrates a communications system 100 for a device that supports access control configurations for shared memory in accordance with aspects of the present disclosure. The communications system 100 may include devices 105, a server 110, and a database 115, among other examples. Although, the communications system 100 illustrates two devices 105, a single server 110, a single database 115, and a single network 120, the present disclosure applies to any multimedia system architecture having one or more devices 105, servers 110, databases 115, and networks 120. The devices 105, the server 110, and the database 115 may communicate with each other and exchange information that supports access control configurations for shared memory, such as packets, data, or control information, via network 120 using communications links 125. In some cases, a portion or all of the techniques described herein supporting access control configurations for shared memory may be performed by the devices 105.

A device 105 may be a cellular phone, a smartphone, a personal digital assistant (PDA), a communication device, a handheld device, a tablet computer, a laptop computer, a cordless phone, a display device (e.g., monitors), and/or the like that supports various types of communication and functional features related to multimedia (e.g., transmitting, receiving, broadcasting, streaming, sinking, capturing, storing, and recording multimedia data). A device 105 may, additionally or alternatively, be referred to by those skilled in the art as a user equipment (UE), a user device, a smartphone, a Bluetooth device, a Wi-Fi device, a mobile station, a subscriber station, a mobile unit, a subscriber unit, a wireless unit, a remote unit, a mobile device, a wireless device, a communications device, a remote device, an access terminal, a mobile terminal, a wireless terminal, a remote terminal, a handset, a user agent, a mobile client, a client, and/or some other suitable terminology. In some cases, the devices 105 may also be able to communicate directly with another device (e.g., using a peer-to-peer (P2P) or device-to-device (D2D) protocol). For example, a device 105 may be able to receive from or transmit to another device 105 variety of information, such as instructions, data, control information, or commands.

The devices 105 may include an application 130 and an access control manager 135. While, the communications system 100 illustrates the devices 105 including both the application 130 and the access control manager 135, the application 130 may be an optional feature for the devices 105. In some cases, the application 130 may be a multimedia-based application that can receive (e.g., download, stream, broadcast) from the server 110, database 115 or another device 105, or transmit (e.g., upload) data to the server 110, the database 115, or to another device 105 via using communications links 125. In some cases, the application 130 may represent, may be ran by, or may be associated with, a sub-system of the device 105, where the sub-system may include one or more corresponding processors.

The access control manager 135 may be part of a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), a discrete gate or transistor logic component, a discrete hardware component, or any combination thereof, or other programmable logic device, discrete gate or transistor logic, discrete hardware components, or any combination thereof designed to perform the functions described in the present disclosure, or the like. For example, the access control manager 135 may control access for a local memory of the device 105.

The server 110 may be a data server, a cloud server, a server associated with a multimedia subscription provider, proxy server, web server, application server, communications server, home server, mobile server, or any combination thereof. The server 110 may in some cases include a distribution platform 140. The distribution platform 140 may allow the devices 105 to discover, browse, share, and download information via network 120 using communications links 125, and therefore provide a digital distribution of the information from the distribution platform 140. The server 110 may also transmit to the devices 105 a variety of information, such as instructions or commands to download applications or data to the device 105.

The database 115 may store a variety of information, such as instructions or commands. For example, the database 115 may store information 145. In some examples, the information 145 may represent sensitive information, such that the information 145 may not be accessed by one or more entities (e.g., the one or more entities may not be authorized for accessing the information 145). The device may support access control configurations for shared memory associated with the information 145. The device 105 may retrieve the stored data (e.g., information 145, such as sensitive information) from the database 115 via the network 120 using communications links 125. In some examples, the database 115 may be a relational database (e.g., a relational database management system (RDBMS) or a Structured Query Language (SQL) database), a non-relational database, a network database, an object-oriented database, or other type of database, that stores the variety of information, such as instructions or commands (e.g., multimedia-related information).

The network 120 may provide encryption, access authorization, tracking, Internet Protocol (IP) connectivity, and other access, computation, modification, or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)), etc. Network 120 may include the Internet.

The communications links 125 shown in the communications system 100 may include uplink transmissions from the device 105 to the server 110 and the database 115, and/or downlink transmissions, from the server 110 and the database 115 to the device 105. The communications links 125 may transmit bidirectional communications and/or unidirectional communications. In some examples, the communications links 125 may be a wired connection or a wireless connection, or both. For example, the communications links 125 may include one or more connections, including but not limited to, Wi-Fi, Bluetooth, Bluetooth low-energy (BLE), cellular, Z-WAVE, 802.11, P2P, LAN, wireless local area network (WLAN), Ethernet, FireWire, fiber optic, and/or other connection types related to communication systems.

An SoC of a device 105 may have multiple processors (e.g., sub-systems), that may use shared memory (e.g., memory buffers), where the shared memory may be associated with additional security to prevent malicious attacks. The additional security at the device 105 may be implemented by dynamically configuring a hardware access control circuit block, which may be located between the processors and the shared memory. Configuring the hardware access control circuit block may be performed by a third processor which is trusted by a sending and a receiving processor. This additional security may increase complexity at the device 105, may result in performance overhead, and may increase power overhead, among other examples.

Various aspects of the present disclosure relate to techniques to support a flexible access control configuration implemented in hardware at the device 105, where portions of the access control configuration may be managed by individual sub-systems of the device 105 (e.g., a network sub-system and a data processing sub-system). The configuration may, for example, support additional configuration fields that may be added to existing access control rules of the device 105. The additional fields may be configured by a first processor (e.g., sub-system) sending information to a second processor (e.g., sub-system), via a shared memory resource or region of the device 105. For example, the network sub-system may fetch or receive the information (e.g., data, information 145, sensitive information) from the network 120, and may place the information in the shared memory resource. The data processing system may decrypt the information, generate a plain text for the information, and re-encrypt the information. The data processing system may place the re-encrypted information back in the shared memory resource (e.g., send the information back to the network sub-system, send the information back to the network 120, via the network sub-system), while keeping the plain text information invisible to the network sub-system. The network sub-system may retrieve the re-encrypted information and send it back to the network 120.

In some cases, a processor of the device 105 may request creation of a new shared memory resource, using a sub-region of an existing memory resource. In such cases, the additional fields may indicate a parent memory resource used to create the new memory resource. The additional fields may further indicate an exclusive write permission for a respective memory region, as well as a chain of delegation of processors that have been assigned the exclusive write permission. By configuring the new fields using the first or second processor, the trusted, third processor may not be engaged to configure the hardware access control circuit block, and the same security may be achieved.

Figure 2:
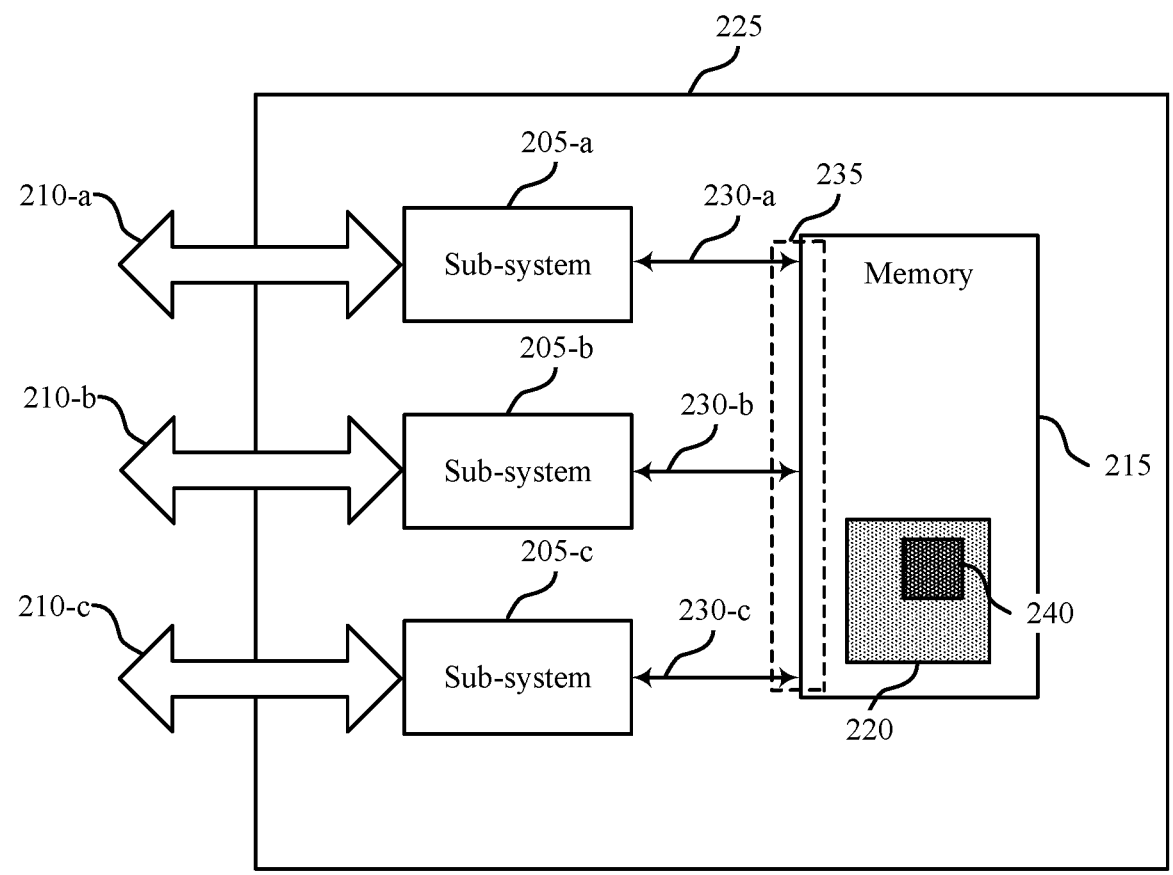
FIG. 2 illustrates an example of a device that supports access control configurations for shared memory in accordance with aspects of the present disclosure.

FIG. 2 illustrates an example of a device 200 that supports access control configurations for shared memory in accordance with aspects of the present disclosure. In some examples, the device 200 may implement aspects of the communications system 100 or may be implemented by aspects of the communications system 100. For example, the device 200 may be an example of a device 105, as described with respect to the communications system 100. The device 200 may include an SoC 225 and may support one or more operations on the SoC 225 (e.g., inter-processor communication operations, using shared memory). The SoC 225 may include (e.g., among other components) sub-systems 205-*a* through 205-*c*, communication links 210-*a* through 210-*c*, communication links 230-*a* through 230-*c*, a hardware access control circuit block 235, a memory component 215, a memory region 220 within the memory component 215, and a memory sub-region 240 within the memory region 220.

The sub-systems 205 may include a network sub-system 205, a data processing sub-system, and one or more other sub-systems (e.g., among other examples). Each sub-system 205 may represent or include one or more respective processors (e.g., at least one processor corresponding to the respective sub-system 205), among other components, which may be used by the respective sub-system 205 to perform one or more of the techniques described herein.

The sub-systems 205 may communicate with the memory component 215 and with entities outside of the SoC 225. The sub-systems 205 (e.g., respective processors of the sub-systems 205) may perform computations, execute code (e.g., one or more processes) to run the device 200, or may perform other computational tasks. The memory component 215 may include one or more memory regions 220 and one or more memory sub-regions 240, which may be used to store data and information for the device 200. For example, the memory component 215 may include one or more arrays of memory cells, where each memory cell may be operable to store one or more bits of information.

The sub-systems 205 may support functionality of the SoC 225 and the device 200. Each sub-system 205 may communicate with the memory component 215 via a respective communication link 230 (e.g., where the communication links may support access to the memory component 215 via the hardware access control circuit block 235). For example, the sub-system 205-a may use the communication link 230-a to write information to the memory component 215 and read information from the memory component 215, the sub-system 205-b may use the communication link 230-b to write information to the memory component 215 and read information from the memory component 215, and so forth. The sub-systems 205 may each communicate with one or more other components inside or outside of the SoC 225 via a respective communication link 210. For example, other components of the device 200 may communicate with one or more sub-systems 205 of the SoC 225 via a respective communication link 210.

The communication links 230 and the communication links 210 may each be a respective example of a wired connection (e.g., a bus, a buffer, an electrode, an electronic connection), which may, for example, couple one or more of input/output (I/O) ports, pins, pads, or other electrical components of a respective sub-system 205 and another component, such as the memory component 215. The communication links 230 and the communication links 210 may, in some cases, be the same type of link or may be different types of links. In some cases, the type of a respective communication link 210 may depend on the external component or device with which one or more of the sub-systems 205 may communicate. In some cases, the type of a respective communication link 230 may depend on a type of information that the associated sub-system 205 writes to the memory component 215. As such, different sub-systems 205 may be associated with one or more same communication links 210 and 230, or with one or more different communication links 210 and 230, or both.

The sub-systems 205 may use the memory component 215 to exchange data and information, and may employ a zero-copy design to increase a speed of information transfer (e.g., among other advantages). For example, the exchange of information and data between sub-systems 205 may include exchanging large payloads between sub-systems 205, information associated with secure image authentication, or weights loading, among other examples. The zero-copy design may limit information to be stored at one memory location (e.g., not copied to additional memory regions) to reduce memory use. In some cases, the sub-systems 205 may operate in parallel, for example, all accessing the memory region 220 to read or write information that is exclusive to the memory region 220. While the zero-copy design may reduce memory use and overhead, it may also be more susceptible to security risks due to lack of information back-ups. Additional security may be applied at the device 200 based on implementing the zero-copy design.

For example, two or more of the sub-systems 205 may be associated with different security domains (e.g., each sub-system 205 may be associated with a respective security domain). In some examples, some sub-systems 205 may be operated, owned, manufactured, or configured by different entities (e.g., a network or communication entity, an original equipment manufacturer (OEM)). Accordingly, some of the different sub-systems 205 may be untrusted (e.g., based on their configuration, based on being associated with a different security domain).

In these and other cases, additional security may be applied based on the zero-copy design. For example, the sub-system 205-a may write a message to the memory component 215 and the sub-system 205-b may receive (e.g., read) the message at the memory component 215 (e.g., may access the memory component 215 to read the message written to the memory component 215). The hardware access control circuit block 235 may temporarily suspend the write permissions of the sub-system 205-a while the sub-system 205-b parses and validates the message. By temporarily suspending write permissions of the sub-system 205-a, the hardware access control circuit block 235 may, in some cases, prevent malicious attacks (e.g., a time-of-check to time-of-use) that may, for example, originate from outside of the sub-system 205-a, such as from outside of the device 200.

In some cases, the sub-system 205-c may represent a sub-system 205 that is "trusted" (e.g., has been verified) by both the sub-system 205-a and the sub-system 205-b. As such, the sub-system 205-c may dynamically configure the hardware access control circuit block 235 to implement the additional security at the device 200. One or more models (e.g., a designated processor model, an ownership model) may exist to determine which sub-system 205 or component of the device 200 may configure the hardware access control circuit block 235. In some cases, the hardware access control circuit block 235 may be part of or may interface with the memory component 215. In some cases, the hardware access control circuit block 235 may communicate with the sub-systems 205 via the communications links 230 to configure aspects of the memory component 215.

The hardware access control circuit block 235 may support additional security at the device 200 by controlling access to the memory component 215. For example, the hardware access control circuit block 235 may act as an additional layer between the sub-systems 205 and the memory component 215. In some cases, for example, the hardware access control circuit block 235 may be configured to identify, intercept, or otherwise prevent malicious attacks originating from information written to the memory component 215. For example, the hardware access control circuit block 235 may enforce one or more preconfigured rules (e.g., access control rules, such as preventing reading and/or writing at the memory component 215) for accessing the memory component 215 (e.g., or a region thereof) by one or more sub-systems 205. The rules may be enforced by the hardware access control circuit block 235 at the memory component 215, the sub-system 205, or both.

In some cases, the additional security may increase complexity and performance overhead (e.g., signaling overhead, computational overhead) at the device 200, thus increasing power use and decreasing efficiency. For example, the sub-system 205-c may exit from a low-power mode when performing the configuring of the hardware access control circuit block 235, which may further increase complexity and power use at the sub-system 205-c. In some cases, additional communications between sub-systems 205 for configuring the access control may further increase overhead. For example, the additional communications may include transferring a request from the sub-system 205-*b* to the sub-system 205-*c* to configure the hardware access control circuit block 235, and may include configuring the hardware access control circuit block 235 by the sub-system 205-*c*.

To support faster reconfiguration of the dynamic access control configuration, the memory component 215, the hardware access control circuit block 235, or both, may be configured with one or more additional configuration fields for access control rules (e.g., in addition to existing access control rules). For example, an additional field of the control rules may indicate one or more sub-systems 205 that have permission to write to the memory component 215 (e.g., sub-systems 205-*a*, 205-*b*, and 205-*c*). In some cases, each section or group of fields of the access control rules may correspond to a region of memory (e.g., memory region 220, or other memory region such as memory sub-region 220). The sub-system 205 with an exclusive write permission (e.g., a sub-system 205 that is an access manager or exclusion manager) for a memory region 220 may be operable to configure the additional field(s) of the access control rules for that memory region 220, while the sub-system 205-*c* may configure the already existing fields. The access control rules may be enforced by the hardware access control circuit block 235 at the memory component 215.

In some cases, the additional field(s) may include a value or field (e.g., a read-only value to other sub-systems 205 which do not have write permissions), which may specify a sub-system 205 (e.g., sub-system 205-*a*) which may have exclusive write permission (e.g., access manager or exclusion manager) for a respective memory region 220. In such cases, the sub-system 205-*a* may reconfigure the additional field(s) of the access control rules so that the sub-system 205-*c* may avoid that task (e.g., thereby avoiding exiting the low-power mode) and reduce the power use of the device 200. The additional field(s) may further indicate a chain of delegation, or a history, of which sub-systems 205 (e.g., processors) have been assigned the exclusive write permission (e.g., access manager or exclusion manager) for a respective memory resource (e.g., a respective memory region 220).

In some cases, a sub-system 205 of the device 200 may request creation of a new shared memory region (e.g., new memory resource), using a memory sub-region 240 of an existing memory resource (e.g., of memory region 220). In such cases, the additional field(s) may indicate a parent memory resource used to create the new memory resource (e.g., may indicate memory region 220 as the parent memory resource). The additional field(s) may also include a value which may indicate a sub-system 205 (e.g., processor) which has exclusive write permission (e.g., access manager or exclusion manager) for the newly created memory resource.

In some cases, the sub-system 205-*a* with the exclusive write permission (e.g., access manager or exclusion manager, indicated by the additional fields) for a memory resource or memory region 220 may change the additional configuration field(s). For example, the sub-system 205-*a* may write information to the memory region 220 while the sub-system 205-*a* has exclusive write permission. Once the sub-system 205-*a* has completed writing the information, the sub-system 205-*a* may change one or more of the additional configuration fields to give exclusive write permission (e.g., access manager or exclusion manager) to another sub-system 205, such as the sub-system 205-*b* (e.g., a sub-system 205 for which the written information is intended). The sub-system 205-*b* may read and validate the message written by the sub-system 205-*a*, and may write additional, or second, information (e.g., a response) to the same memory region 220. Once the sub-system 205-*b* has completed its message, the sub-system 205-*b* may change the additional field to give exclusive write permission (e.g., access manager or exclusion manager) back to the sub-system 205-*a* or to another sub-system 205, such as sub-system 205-*c*.

Following this scheme, one sub-system 205 at a time may have exclusive write access (e.g., access manager or exclusion manager) to the memory region 220, thus keeping the device 200 secure. Additionally, this scheme provides for write permissions to be granted by the sub-system 205 that has just finished writing a message, preventing unnecessary "wake-ups" of additional sub-systems 205 (e.g., a trusted sub-system 205-*c*), which may save energy. The described techniques may reduce overhead and improve energy efficiency while maintaining a higher level of security at the device 200. For example, the write permission may, in some cases, automatically enforce a single write from a single sub-system 205, while preventing malicious attacks such as time-of-check to time-of-use. Further the write permission may reduce or eliminate reconfiguration overhead for determining write permissions.

Figure 3:
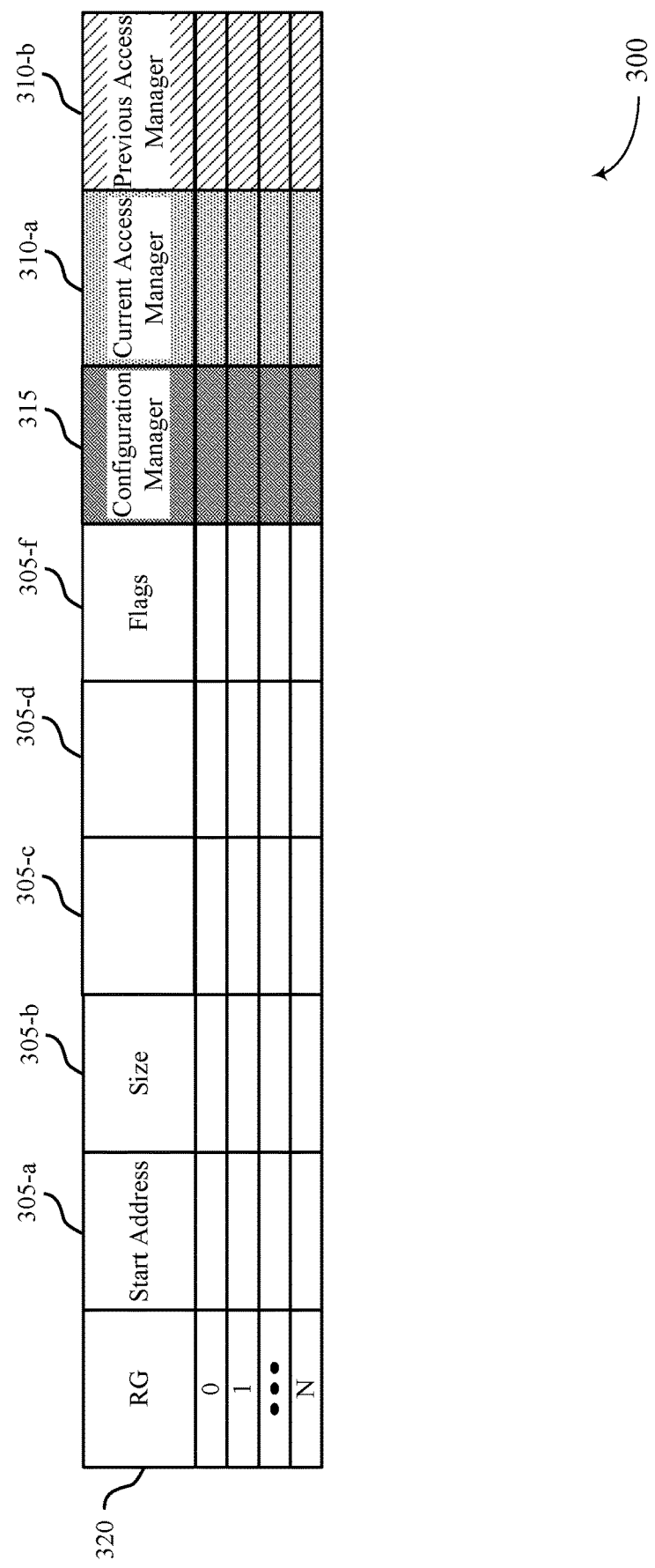
FIG. 3 illustrates an example of a data structure that supports access control configurations for shared memory in accordance with aspects of the present disclosure.

FIG. 3 illustrates an example of a data structure 300 that supports access control configurations for shared memory in accordance with aspects of the present disclosure. In some examples, the data structure 300 may implement aspects of the communications system 100 or the device 200 or may be implemented by aspects of the communications system 100 or the device 200. For example, the data structure 300 may represent an access control configuration, or an access control configuration table, as described herein (e.g., as implemented at or stored in an access control hardware block), and may indicate one or more access control parameters for a memory component 215, and one or more memory regions 220 or sub-regions 240 of the memory component 215, as described with respect to FIG. 2. In some cases, fields of the data structure 300 may be written or configured by one or more sub-systems 205 (e.g., or the processors thereof) as described with reference to FIG. 2. The data structure 300 may include one or more fields, where each field may indicate one or more aspects of configuring permissions for access (e.g., read and write permissions) to a memory component of a device, as described with reference to FIG. 2.

The data structure 300 may include a set of fields, each relating to one or more aspects of accessing shared memory (e.g., a memory component, or a region thereof). For example, each row of a table associated with, or representative of, the data structure 300 may indicate one or more parameters for a respective resource group 320, or a memory region or sub-region, of the memory component. Each of fields 305-*a* through 305-*e* (e.g., columns of the table) may include a respective parameter representative of a corresponding characteristic of a resource group 320. For example, a first field 305-*a* may correspond to a start address for a resource group 320, a second field 305-*b* may correspond to a size for a resource group 320, and so on. In other examples, the first and second fields may correspond to one field 305, which may indicate an address range for a resource group 320.

In some cases, a field 305-*f* may indicate one or more "flags" associated with a resource group 320 (e.g., events that may trigger a specific protocol for the processors and/or memory component). For example, in some cases, a flag in the field 305-*f* may indicate which processor has default writing permission (e.g., when no permission changes have been implemented). In some cases, a flag may indicate whether the writing permissions may be reassigned if there is a system restart (e.g., a behavior if a current writing processor crashes). In some cases, a flag may indicate whether an interrupt protocol (e.g., steps for addressing anomalous system behavior) is triggered if writing permissions are transferred to another processor.

The data structure 300 may also include a field 310-*a*, which may include current information (e.g., fields that may be written in real time). The field 310-*a* may be written by a sub-system or processor having current permission to write to the resource group 320, where the writing processor may set the field 310-*a* at any time. The field 310-*a* may also indicate a sub-system or processor that has write permission (e.g., access manager or exclusion manager) for a resource group 320. In some cases, if there has been no previous information written to the field 310-*a*, any processor may write information to the field 310-*a*. In some cases, a processor with current writing permission may hand off the permission to another processor by indicating the other processor in the field 310-*a* (e.g., writing a value indicative of the other processor), as described with reference to FIG. 2.

The data structure 300 may further include a field 310-*b*. In some cases, the field 310-*b* may include previous information (e.g., fields that were previously entered in the field 310-*a*). For example, if the writing permission transfers from a first processor to a second processor, information from the field 310-*a* (e.g., before being written over by the first processor) may transfer to the field 310-*b*. The field 310-*b* may therefore indicate a sub-system or processor that previously had write permission (e.g., access manager or exclusion manager) for a resource group 320. Upon transferring the information from the field 310-*a* to the field 310-*b* and writing over the information in the field 310-*a*, the field 310-*a* may indicate that the second processor has the writing permission and the field 310-*a* may become available for writing by the second processor. The field 310-*b* may thus be referred to as a read-only field. For example, the second processor may read the entries transferred from the field 310-*a* to the field 310-*b*, but may not write to the field 310-*b*. The field 310-*b* may be updated with the previous information from the field 310-*a* each time the writing permission is transferred to a new processor.

The fields 305 of the data structure 300 (e.g., including fields 305-*a* through 305-*f*) for a respective resource group 320 may be written by a sub-system assigned to manage or control the configuration for that resource group 320. The assigned sub-system may, for example, represent a configuration manager processor or sub-system, as indicated by a field 315 of the data structure. The configuration manager sub-system or processor may be fixed when the corresponding resource group 320 is initialized by the device, and may have permissions to change or modify the general configuration of the resource group 320 (e.g., when also assigned as an access manager sub-system or processor), where modifying the general configuration of the resource group 320 may include changing or modifying the fields 305 (e.g., among other parameters). A configuration of a resource group 320 (e.g., the fields in the data structure 300 corresponding to the resource group 320) may be readable to the configuration manager sub-system or processor, to a current access manager sub-system or processor, and to any other access manager sub-system or processor assigned any permission within the data structure 300.

Figure 4:
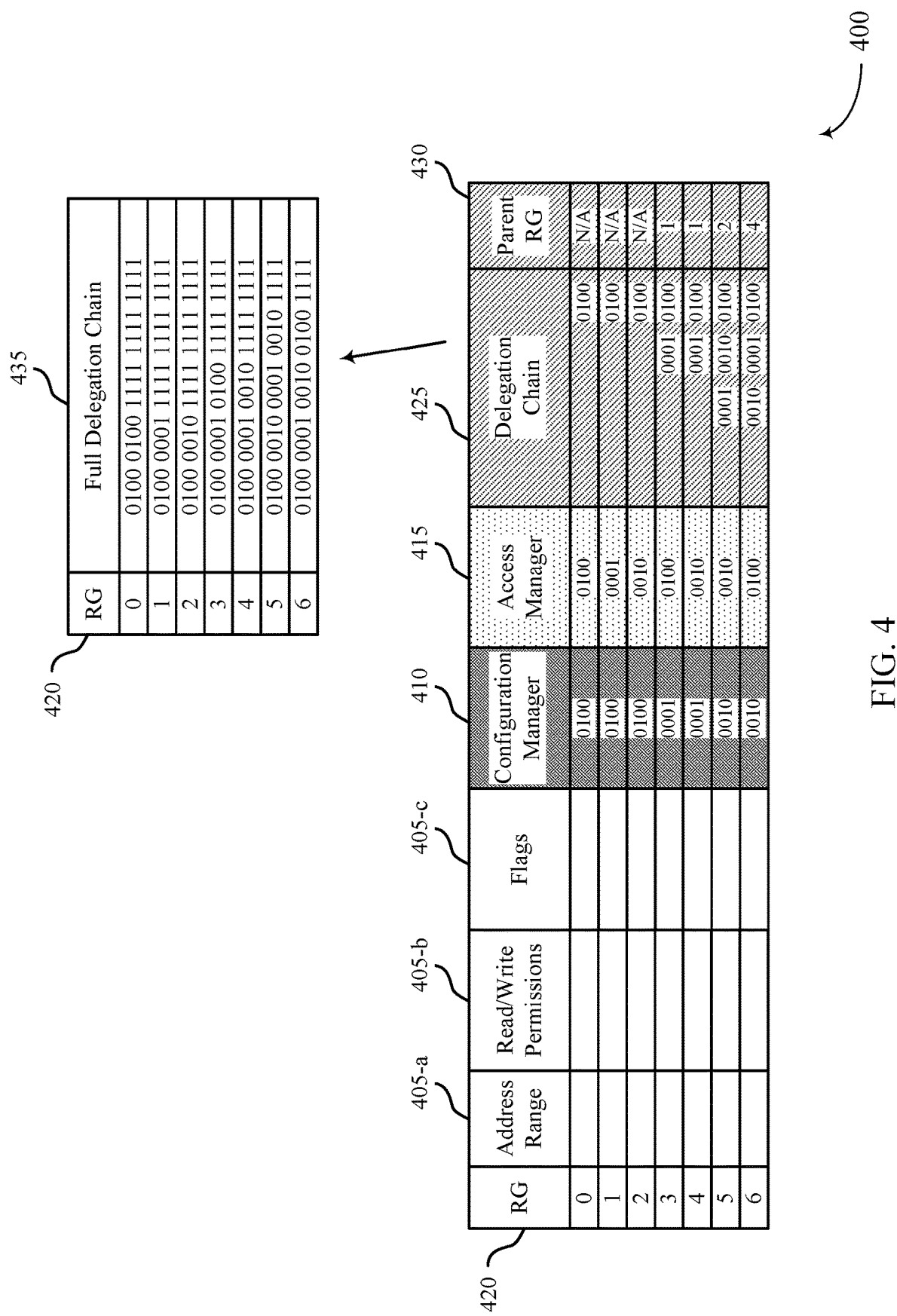
FIG. 4 illustrates an example of a data structure that supports access control configurations for shared memory in accordance with aspects of the present disclosure.

FIG. 4 illustrates an example of a data structure 400 that supports access control configurations for shared memory in accordance with aspects of the present disclosure. In some examples, the data structure 400 may implement aspects of the communications system 100 or the device 200, or may be implemented by aspects of the communications system 100 or the device 200. For example, the data structure 400 may represent an access control configuration, or an access control configuration table, as described herein (e.g., as implemented at or stored in an access control hardware block), and may indicate one or more access control parameters for a memory component 215, and one or more memory regions 220 or sub-regions 240 of the memory component 215, as described with respect to FIG. 2. In some cases, fields of the data structure 400 may be written or configured by one or more sub-systems 205 (e.g., or the processors thereof) as described with reference to FIG. 2. The data structure 400 may include one or more fields, where each field may indicate one or more aspects of configuring permissions for access (e.g., read and write permissions) to a memory component of a device, as described with reference to FIG. 2.

Similar to the data structure 300 described with reference to FIG. 3, the data structure 400 may include a set of fields, each relating to one or more aspects of accessing shared memory (e.g., a memory component, or a region thereof). For example, each row of a table associated with, or representative of, the data structure 400 may indicate one or more parameters for a respective resource group 420, or a memory region or sub-region, of the memory component. For example, a first field 405-*a* may indicate an address range for a resource group 420, a second field 405-*b* may indicate read and/or write permissions for the resource group 420, and a third field 405-*c* may indicate one or more flags for the resource group 420 (e.g., which may be examples of flags as described with reference to FIG. 3). Other fields 405 may be included in the data structure 400 without departing from the scope of the present disclosure. For example, the other fields 405 may include information regarding the access control configuration for the memory component and its respective resource groups 420.

As described with reference to FIG. 3, the fields 405 of the data structure 400 (e.g., including, but not limited to, fields 405-*a* through 405-*c*) for a respective resource group 420 may be written by a sub-system assigned to manage or control the configuration for that resource group 420. The assigned sub-system may, for example, represent a configuration manager processor or sub-system, as indicated by a field 410 of the data structure 400. The configuration manager sub-system or processor may be fixed when the corresponding resource group 420 is initialized by the device, and may have permissions to change or modify the general configuration of the resource group 420 (e.g., when also assigned as an access manager sub-system or processor), where modifying the general configuration of the resource group 420 may include changing or modifying the fields 405 (e.g., among other parameters).

As described with reference to FIG. 3, the data structure 400 may also indicate an access manager (or an exclusion manager) for each resource group 420, such as in a field 415. A configuration of a resource group 420 (e.g., the fields in the data structure 400 corresponding to the resource group 420) may be readable to the configuration manager sub-system or processor, to a current access manager sub-system or processor, and to any other access manager sub-system or processor assigned any permission within the data structure 400.

In the example shown in FIG. 4, the field 410 may indicate the configuration manager sub-system or processor using a set of bits. While sets of four bits are illustrated, it is to be understood that the indication of the configuration manager may include any number of bits. In one example, a first sub-system may be represented by '0100,' a second sub-system may be represented by '0001,' and a third sub-system may be represented by '0010.' In the example described herein, the first sub-system may be a managing sub-system, or may be assigned as the configuration manager for a first three resource groups 420 (e.g., resource groups '0,' '1,' and '2'). These first three resource groups 420 may be the sole resource groups 420 configured by the device, and may not have any parent resource groups 420. Because the first three resource groups 420 may be the sole resource groups 420 configured by the device, and because these groups may be managed by the first sub-system or processor, the other sub-systems and processors may not be assigned shared memory for beginning communications with other processors or sub-systems.

Accordingly, as described with reference to FIG. 2, the access control configuration may be configured to support delegation of a sub-region (or sub-resource) of the configured resource groups 420 to another sub-system. For example, the first sub-system ('0100') (e.g., or the device, or both) may create or allocate new resource groups '3' and '4' from respective sub-regions of resource group '1.' When creating the new resource groups 420, the first sub-system may assign a configuration manager and an access manager to the new resource groups 420. For example, the second sub-system (e.g., '0001') may be assigned as the configuration manager and as a first access manager for each of the new resource groups 420. When creating the new resource groups 420, the first sub-system may also indicate, in a field 430 of the data structure 400, a parent resource group from which the new resource groups 420 were created. In the examples of resource groups '3' and '4,' the parent resource group 420 may be resource group '1.'

In the examples described and illustrated herein, the first sub-system may further create or allocate a new resource group '5' from resource group '2,' where resource group '5' may be configured with the third sub-system ('0010') as the configuration manager and as the original access manager. Similarly, the second sub-system ('0001') may create or allocate a new resource group '6' from resource group '4,' where resource group '6' may be configured with the third sub-system ('0010') as the configuration manager and as the original access manager. It is to be understood that allocation of any number of resource groups, with any configuration permissions, may be supported by the present disclosure, which is not limited to the examples described herein.

In order to support the allocation of sub-regions of a resource group 420, the data structure 400 may further include a field 425, which may indicate a delegation chain for a resource groups 420. The delegation chain for a respective resource group 420 may indicate, for example, a history of the previous access managers for that resource group 420. The field 425 may have a variable length (e.g., based on the quantity of previous access managers), and may have a maximum length of (M−1)*N bits, where N may represent a total number of bits for identifying a sub-system or processor (e.g., 4 bits) and where M may represent a maximum number of delegations supported (e.g., a number of delegations indicated by the field 425), where a delegation may represent a resource group 420 being assigned to another access manager. The delegation chain field 425 may be padded with bits (e.g., bits set to a certain value, such as '1') to indicate empty entries in the delegation chain (e.g., if a maximum number of entries or delegations has not yet been reached).

Similar to the "Previous Access Manager" field described with reference to FIG. 3, the field 425 may not be directly writable, and may be automatically updated upon changing the access manager for a resource group 420 (e.g., may be updated to include the most recent access manager, as well as the previous access managers). To determine a full delegation chain 435 for a respective resource group 420, the delegation chain field 425 may be concatenated with the access manager field 415.

In the example illustrated by FIG. 4, resource group '0' may not be delegated (e.g., assigned a new access manager), and may therefore have an empty delegation chain field 425. Resource group '1' may originally be configured with the first sub-system or processor ('0100') as the access manager, and may then be assigned the second sub-system or processor ('0001') as the access manager (e.g., having exclusive write permissions). Thus, the delegation chain field 425 for resource group '1' may indicate sub-system '0100' and the access manager field 415 may indicate sub-system '0001.' Accordingly, the full delegation chain 435 (e.g., a concatenation of the access manager and the delegation chain) may indicate sub-system '0100' then '0001.'

Similarly, resource group '2' may originally be configured with the first sub-system or processor ('0100') as the access manager, and may then be assigned the third sub-system or processor ('0010') as the access manager (e.g., having exclusive write permissions). Thus, the delegation chain field 425 for resource group '1' may indicate sub-system '0100' and the access manager field 415 may indicate sub-system '0010.' Accordingly, the full delegation chain 435 (e.g., a concatenation of the access manager and the delegation chain) may indicate sub-system '0100' then '0010.'

Resource group '3' may originally be configured with the first sub-system or processor ('0100') as the access manager, because resource group '3' was originally part of resource group '1.' Upon allocation or creation of resource group '3,' resource group '3' may be assigned to the second sub-system ('0001'), which may be the new access manager. At some time (e.g., after writing information for the first sub-system to read), the second sub-system may reassign resource group '3' to the first sub-system as the access manager. Thus, the delegation chain field 425 for resource group '3' may indicate that sub-system or processor '0100' was the original access manager, followed by sub-system or processor '0001.' The access manager field 415 may indicate that sub-system '0100' is the current access manager. Thus, the full delegation chain 435 for resource group '3' may include '0100,' followed by '0001,' followed by '0100.'

Similarly, because resource group '4' was originally created from resource group '1,' and because resource group '6' was created from resource group '4,' the original sub-system or processor indicated in the delegation chain field 425 for these resource groups 420 may be '0100.' Resource group '5' may also indicate sub-system or processor '0100' as the first access manager in the delegation chain field 425, based on resource group '5' being created from resource group '2' (e.g., originally managed by processor '0100'). In the case of resource group '4,' sub-system '0001' may receive the resource group allocation and access manager permission from sub-system '0100,' and may then assign the access manager permission to the third sub-system '0010' (e.g., after writing information for the third sub-system to read). Thus, the delegation chain field 425 for resource group '4' may indicate sub-system '0100,' followed by sub-system '0001,' and the access manager field may indicate sub-system '0010.' The full delegation chain 435 for this resource group 420 may be the concatenation of these two fields.

Similar processes may apply to the other resource groups 420 illustrated in FIG. 4. For example, the delegation chain field 425 for resource group '6' may indicate sub-system '0100' (e.g., based on the original resource group '1'), followed by sub-system '0001' (e.g., based on the parent resource group '4'), followed by sub-system '0010' (e.g., based on the creation or allocation of resource group '6,' with access manager permissions assigned to '0010'). The access manager field 415 of resource group '6' may indicate sub-system '0100' (e.g., based on sub-system '0010' assigning the access manager to sub-system '0100,' such as after writing information in the resource group for sub-system '0100').

The delegation chain field 425, along with the access manager field 415, may support increased security for delegation memory sub-regions. For example, if a transaction from a sub-system requests access to a resource group 420 (e.g., region or sub-region) of the memory component of the device, the device (e.g., access control hardware block) may determine whether the sub-system has access to that resource group 420. If the sub-system does not have access, the access request may be denied. The device may determine, for example, whether the sub-system has access to the resource group 420 by performing an AND operation on the sub-system identifier (ID) (e.g., the bits indicating the sub-system) and a full delegation chain 435 (e.g., segment by segment) for the resource group 420. In such cases, access may be denied to the sub-system if the AND operation returns a zero for all segments of the full delegation chain 435.

In some cases, an access request from a sub-system may be associated with multiple resource groups 420, and the AND operation may therefore be performed on the full delegation chain 435 for each of the multiple resource groups 420 (e.g., segment by segment). In such cases, access may be denied to the sub-system if the AND operation returns a zero for all segments of the full delegation chain 435 for any of the respective resource groups 420.

In a first example of a security scenario (e.g., a scenario in which security may be compromised), a malicious sub-system (e.g., a malicious actor with access to a sub-system) may configure a resource group 420 with an address range overlapping another resource group 420 that has access granted to another sub-system. This is an attack which may block access of the overlapping memory range for the other sub-system (e.g., non-malicious sub-system). The device (e.g., access control hardware) may mitigate such an attack by configuring a new resource group for the other, non-malicious sub-system, which would not have ever been exposed to untrusted code.

In a second example of a security scenario, a malicious sub-system (e.g., a malicious actor with access to a sub-system) may configure a resource group 420 to gain access to an address range (e.g., within a resource group 420) over which another sub-system is the current access manager. In such cases, the other sub-system may not have delegated access manager permissions to the malicious sub-system, and such an attack may therefore not be possible because the malicious sub-system may not be included in the full delegation chain 435 (e.g., which may prevent access) and the malicious sub-system may be unable to change the delegation chain field 425 (e.g., because the field 425 is a read-only field).

Figure 5:
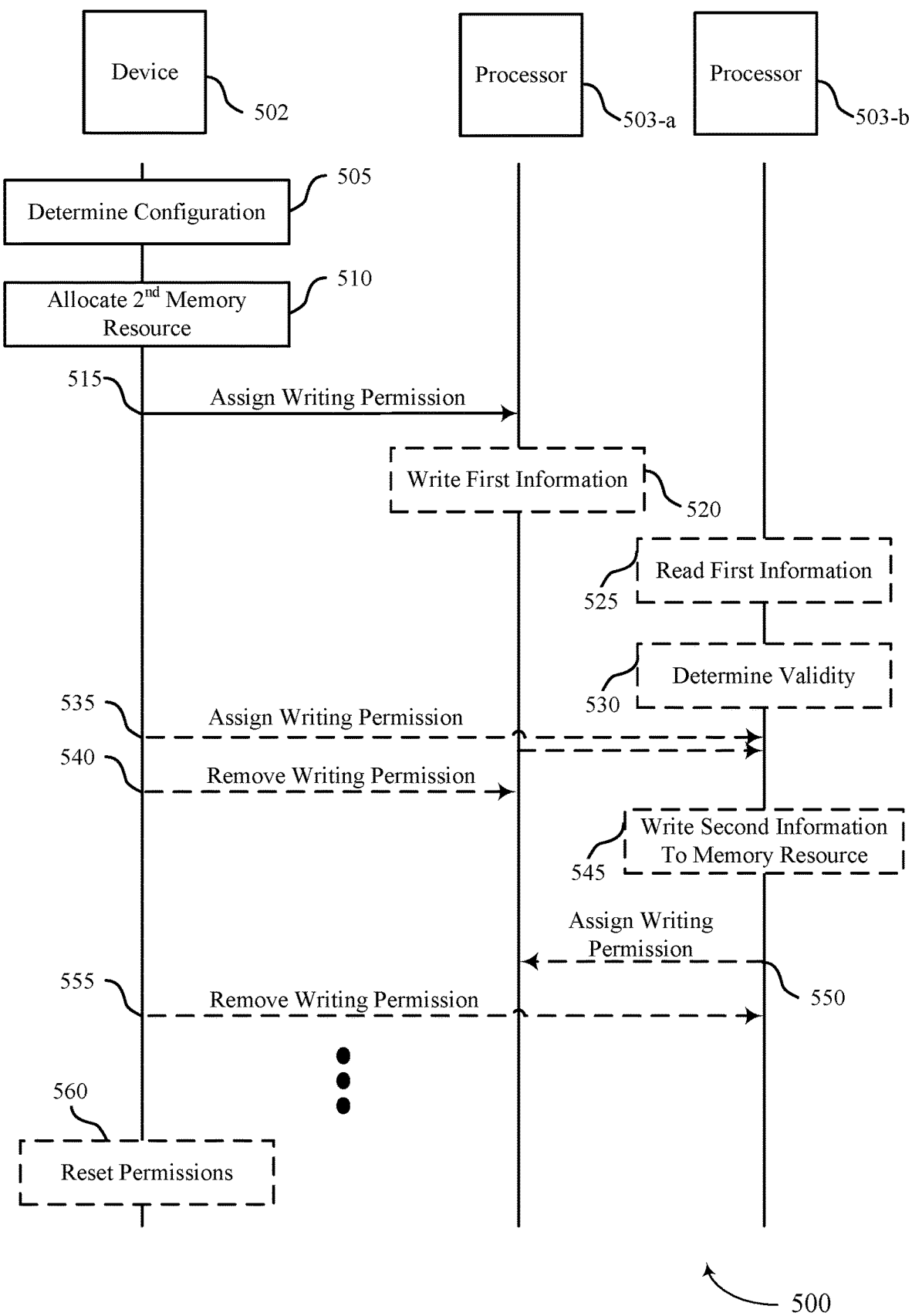
FIG. 5 illustrates an example of a process flow that supports access control configurations for shared memory in accordance with aspects of the present disclosure.

FIG. 5 illustrates an example of a process flow 500 that supports access control configurations for shared memory in accordance with aspects of the present disclosure. The process flow 500 may implement or may be implemented by a device 502, which may include multiple processors (e.g., processors 503-a and 503-b), which may be examples of a respective device and processors as described with reference to FIGS. 1 through 4. The device 502 and the processors 503-a and 503-b may be coupled via a respective physical and logical interface that may support communication between the processors and one or more components of the device 502 (e.g., a shared memory component, access control hardware, a controller). The device 502 may be an example of a device 105 as described with reference to FIG. 1, or may be an example of another device that uses an SoC and is configured to operate in response to commands from the processor(s) or SoC.

At 505, the device 502 (e.g., an SoC, processor, access control hardware, controller of the device 502) may determine a configuration for a memory component (e.g., shared memory component) of the device 502 (e.g., of the SoC). The configuration may indicate multiple processors 503 (e.g., sub-systems, processors 503 of respective sub-systems) that share the memory component, which may include processors 503-a and 503-b. The configuration may also indicate one or more permissions for a first memory resource (e.g., a memory region, resource group) of the memory component, and may indicate a set of one or more processors 205 of the multiple processors 205 associated with the first memory resource. For example, the configuration may indicate which of the processors 205 may receive initial writing permissions (e.g., access manager permissions) to the first memory resource. In some cases, the configuration may indicate writing permission for one processor 503. In some cases, the processor 503 that may receive writing permission may be a trusted processor (e.g., verified by both the memory component and other processors) or it may be a sending processor (e.g., a processor intending to write a message to the first memory resource).

The configuration may additionally indicate one or more parameters of the first memory resource, such as a start address, a size, an address range, and one or more flags associated with the first memory resource, for example, as described with reference to FIGS. 3 and 4. In some cases, as described with reference to FIGS. 3 and 4, the configuration may indicate multiple memory resources and corresponding permissions, and other parameters, for the multiple memory resources.

At 510, the device 502 may allocate (e.g., create) a second memory resource of the memory component by allocating a sub-region of the first memory resource to the second memory resource. For example, as described with reference to FIG. 4, the device 502 (e.g., a processor of the device such as processor 503-b) may allocate a portion (e.g., sub-region) of a resource group to a processor 503 (e.g., processor 503-a) that may not have access to another resource group. When allocating the second memory resource, the device 502 may assign a configuration manager to the second memory resource. For example, the device 502 may assign processor 503-a to control the configuration of the second memory resource based on allocating the second memory resource (e.g., allocating the sub-region of the first memory resource to the second memory resource).

When allocating the second memory resource, the device 502 may also assign or update a chain of delegation (e.g., a chain of delegation field) for the second memory resource. For example, the device 502 may update an indication of a chain of delegation associated with the second memory resource to include the second processor (e.g., as well as another processor having the access manager permissions for the first memory resource, such as processor 503-*b*) based on allocating the second memory resource (e.g., allocating the sub-region of the first memory resource to the second memory resource). Based on allocating the second memory resource, the device 502 (e.g., or a component thereof) may update a data structure (e.g., configuration) to include fields associated with the second memory resource, such as the fields described with reference to FIG. 4.

At 515 (e.g., as part of or after allocating the second memory resource), the device 502 may assign a permission to write to the second memory resource (e.g., access manager permissions) to processor 503-*a* (e.g., the processor may be indicated, by the configuration, to have the writing permission). For example, the device 502 may indicate (e.g., in a field of a data structure or table) that the writing permission is currently assigned to processor 503-*a*. Based on the configuration indicating that the writing permission is assigned to processor 503-*a*, processor 503-*a* may be permitted to write to the second memory region (e.g., a shared memory region or memory resource, indicated by the configuration or table) of the memory component. The permission may be assigned, for example, as part of or based on allocating the sub-region of the first memory resource to the second memory resource. The device 502 (e.g., an SoC, processor, access control hardware, controller of the device 502) may prevent other processors (e.g., processor 503-*b*) from writing to the second memory resource based on the assigned permission to the processor 503-*a*.

At 520, in some cases, processor 503-*a* may write first information to the second memory resource (e.g., memory region or sub-region, resource group), for example, based on the assigned permission. In some cases, the information may be a message intended for another processor sharing the memory component (e.g., processor 503-*b*). In some cases, the information may indicate that the processor 503-*b* is to be assigned write permissions to the second memory resource, or may indicate other information for communication between processors 503-*a* and 503-*b*, or both.

At 525, in some cases, processor 503-*b* may read the first information, from the second memory resource, based on the first information being written to the second memory resource by the processor 503-*a*. Processor 503-*b*, and any other processors other than the processor 503-*a* (e.g., if the write permission is unchanged), may have read-only permissions to access the memory component. For example, processor 503-*a* may retain writing permissions as processor 503-*b* reads the first information, until processor 503-*a* assigns writing permissions to processor 503-*b*, or to another processor.

At 530, in some cases, processor 503-*b* may determine a validity of the first information based on reading the first information. For example, processor 503-*b* may determine whether the first information was written by a trusted source (e.g., a processor that has been verified, or that has write permissions). In some cases, processor 503-*b* may determine whether the first information is associated with a malicious attack (e.g., from an entity outside the device 502, or from a processor that has been compromised).

In some cases, at 535, the device 502 (e.g., an SoC, processor, or controller of the device 502), or processor 503-*a*, may assign the permission to write to the second memory resource to processor 503-*b*, for example, based on writing the first information to the second memory resource by processor 503-*a*. Based on assigning the write permission to processor 503-*b*, the device 502 (e.g., or a component thereof), or processor 503-*a* may update an indication of the chain of delegation associated with the second memory resource to include processor 503-*b* (e.g., and one or more other previous processors with write permissions or access manager permissions, such as processor 503-*a*). Assigning the write permission to processor 503-*b* may further include preventing (e.g., by the device 502 or a component thereof) other processors (e.g., processor 503-*a*) from writing to the second memory resource based on assigning the permission to processor 503-*b*.

For example, in some cases, at 540, the device 502 may remove writing permission from the processor 503-*a* in order to prevent the processor 503-*a* from writing to the second memory resource. In some cases, the actions at 535, at 540, or both may be performed such that there may be little or no time in which two processors simultaneously have writing permissions to the memory resource. In some cases, the writing permission assigned to processor 503-*b* may not be activated until the writing permission has been removed from processor 503-*a*, or in some cases, assigning the writing permission to processor 503-*b* may remove the writing permission from processor 503-*a*. In some cases, the assignment of writing permission to processor 503-*b* may trigger the first information, or a previous writing permission assigned to processor 503-*a*, to move to a read-only portion of the memory resource (e.g., a read-only field of a data structure or configuration, such as a delegation chain, indicating one or more previous processors having been assigned the writing permission).

At 545, in some cases, processor 503-*b* may write second information to the second memory resource, which may be in response to the first information and may be based on the assigned writing permission to processor 503-*b*. In some cases, processor 503-*b* may write to the same area of the second memory resource as processor 503-*a* (e.g., which may be available based on the change in writing permissions). The second information may include a message related to the first information (e.g., a response to processor 503-*a*). In some cases, the second information may indicate a next processor to be assigned write permission.

For example, at 550, in some cases, processor 503-*b* may assign the permission to write to the second memory resource to another processor (e.g., to the processor 503-*a*), for example, based on writing the second information. In some cases, processor 503-*b* may do so to request a response from processor 503-*a*, related to the second information. In some cases, processor 503-*b* may assign the permission to write to the second memory resource to another processor 503 that is different from processor 503-*a* (e.g., to a third processor).

Assigning the permission may further include preventing (e.g., by the device 502 or a component thereof) processor 503-*b* and other processors from writing to the second memory resource based on the writing permission being assigned to the processor 503-*a* or the other processor 503. In some cases, processor 503-*b* may indicate the permission assignment to processor 503-*a* or the other processor 503 via the second information written to the second memory resource. For example, processor 503-*b* may write a value to a field of a data structure or configuration related to the second memory resource, where the field may indicate writing permissions for the processors sharing the second memory resource.

Based on assigning the write permission to processor 503-*a* or the other processor 503, the device 502 (e.g., or a component thereof), or processor 503-*b*, may update an indication of the chain of delegation associated with the second memory resource to include processor 503-*a* or the other processor 503 (e.g., and one or more other previous processors with write permissions or access manager permissions, such as processor 503-*a* and processor 503-*b*). In some cases, the assignment of writing permission to processor 503-*a* or the other processor 503 may trigger the second information, or a previous writing permission assigned to processor 503-*b*, to move to a read-only portion of the memory resource (e.g., a read-only field of a data structure or configuration, such as a delegation chain, indicating one or more previous processors having been assigned the writing permission).

In some cases, at 555, the device 502 may remove writing permission from processor 503-*b*, for example, based on or in response to assigning the writing permission to processor 503-*a* or the other processor 503. The assigning at 550 and the removing at 555 may be performed such that processors 503-*a* and 503-*b* may not have simultaneous writing permission, as described herein. In some cases, assigning the writing permission to processor 503-*a* may remove the writing permission from processor 503-*b*.

At 560, in some cases, the device 502 (e.g., a processor, SoC, or other component thereof) may reset the permission to write to the second memory resource, the first memory resource, or both (e.g., may reset all memory resource permissions). For example, the SoC may revert to an original configuration (e.g., a default setting). In some cases, the device 502 may reset the permissions after a number of iterations of the processes described with reference to 505 through 555, or variations thereof. For example, the device 502 may reset the permissions when the processors 503-*a* and 503-*b* have concluded one or more techniques described herein for shared memory. In some cases, resetting the permissions may result in each of the set of processors associated with the memory resource being operable to write to the first memory resource, the second memory resource, or both.

Figure 6:
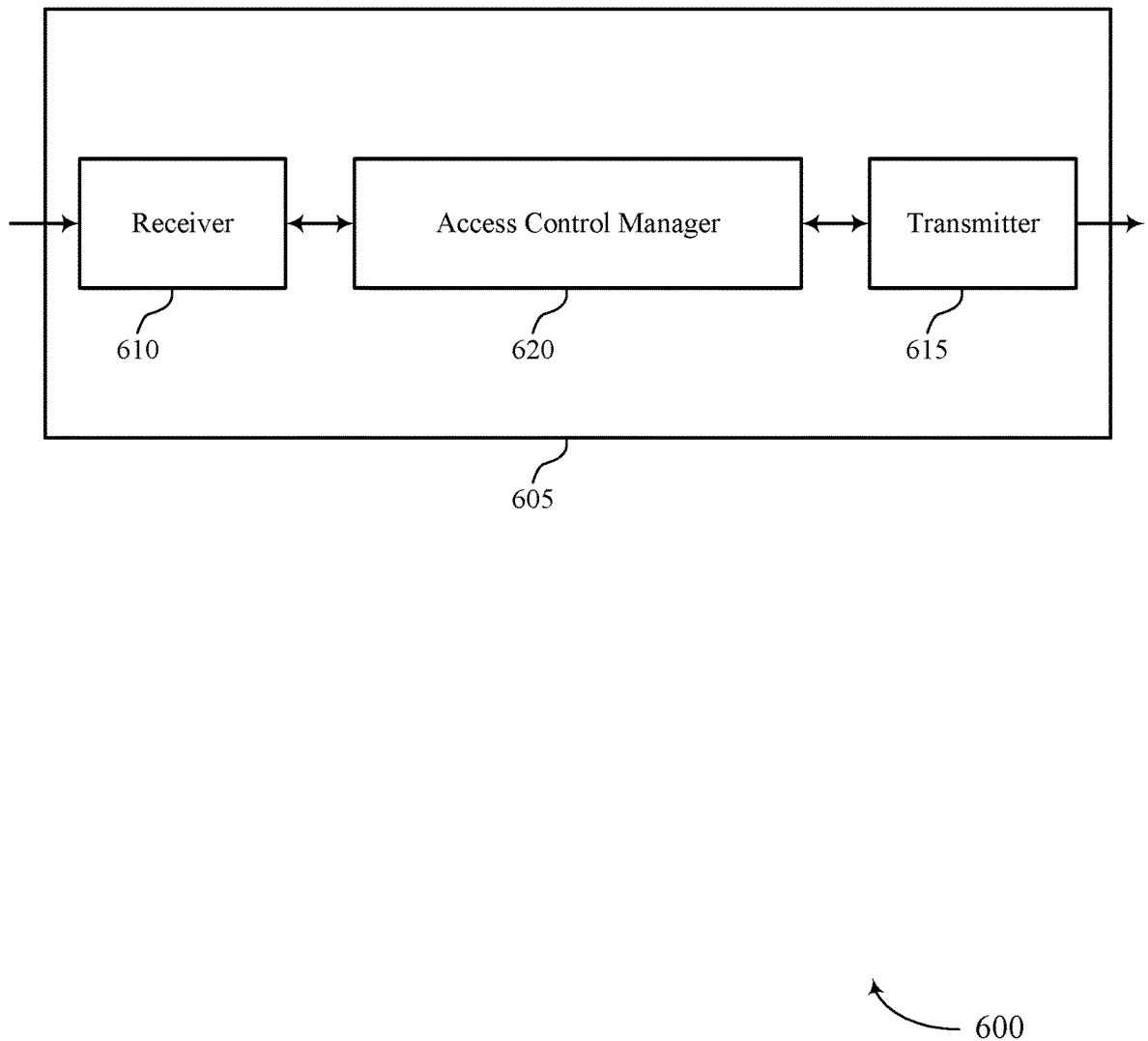
FIGS. 6 and 7 show block diagrams of devices that support access control configurations for shared memory in accordance with aspects of the present disclosure.

FIG. 6 shows a block diagram 600 of a device 605 that supports access control configurations for shared memory in accordance with aspects of the present disclosure. The device 605 may be an example of aspects of a device as described herein. The device 605 may include a receiver 610, a transmitter 615, and an access control manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to access control configurations for shared memory). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to access control configurations for shared memory). In some examples, the transmitter 615 may be co-located with a receiver 610 in a transceiver module. The transmitter 615 may utilize a single antenna or a set of multiple antennas.

The access control manager 620, the receiver 610, the transmitter 615, or various combinations thereof or various components thereof may be examples of means for performing various aspects of access control configurations for shared memory as described herein. For example, the access control manager 620, the receiver 610, the transmitter 615, or various combinations or components thereof may support a method for performing one or more of the functions described herein.

In some examples, the access control manager 620, the receiver 610, the transmitter 615, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the access control manager 620, the receiver 610, the transmitter 615, or various combinations or components thereof may be implemented in code (e.g., as communications management software or firmware) executed by a processor. If implemented in code executed by a processor, the functions of the access control manager 620, the receiver 610, the transmitter 615, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the access control manager 620 may be configured to perform various operations (e.g., receiving, monitoring, transmitting) using or otherwise in cooperation with the receiver 610, the transmitter 615, or both. For example, the access control manager 620 may receive information from the receiver 610, send information to the transmitter 615, or be integrated in combination with the receiver 610, the transmitter 615, or both to receive information, transmit information, or perform various other operations as described herein.

The access control manager 620 may support managing access control at a shared memory of the device 505 in accordance with examples as disclosed herein. For example, the access control manager 620 may be configured as or otherwise support a means for determining a configuration for a memory component of the device 505, the configuration indicating a set of multiple processors that share the memory component and indicating one or more permissions for a memory resource of the memory component. The access control manager 620 may be configured as or otherwise support a means for assigning, to a first processor of the set of multiple processors, a permission to write to the memory resource based on the configuration. The access control manager 620 may be configured as or otherwise support a means for writing first information to the memory resource by the first processor based on the assigned permission to the first processor. The access control manager 620 may be configured as or otherwise support a means for preventing a second processor of the set of multiple processors and a remainder of the set of multiple processors from writing to the memory resource based on the assigned permission to the first processor.

Figure 7:
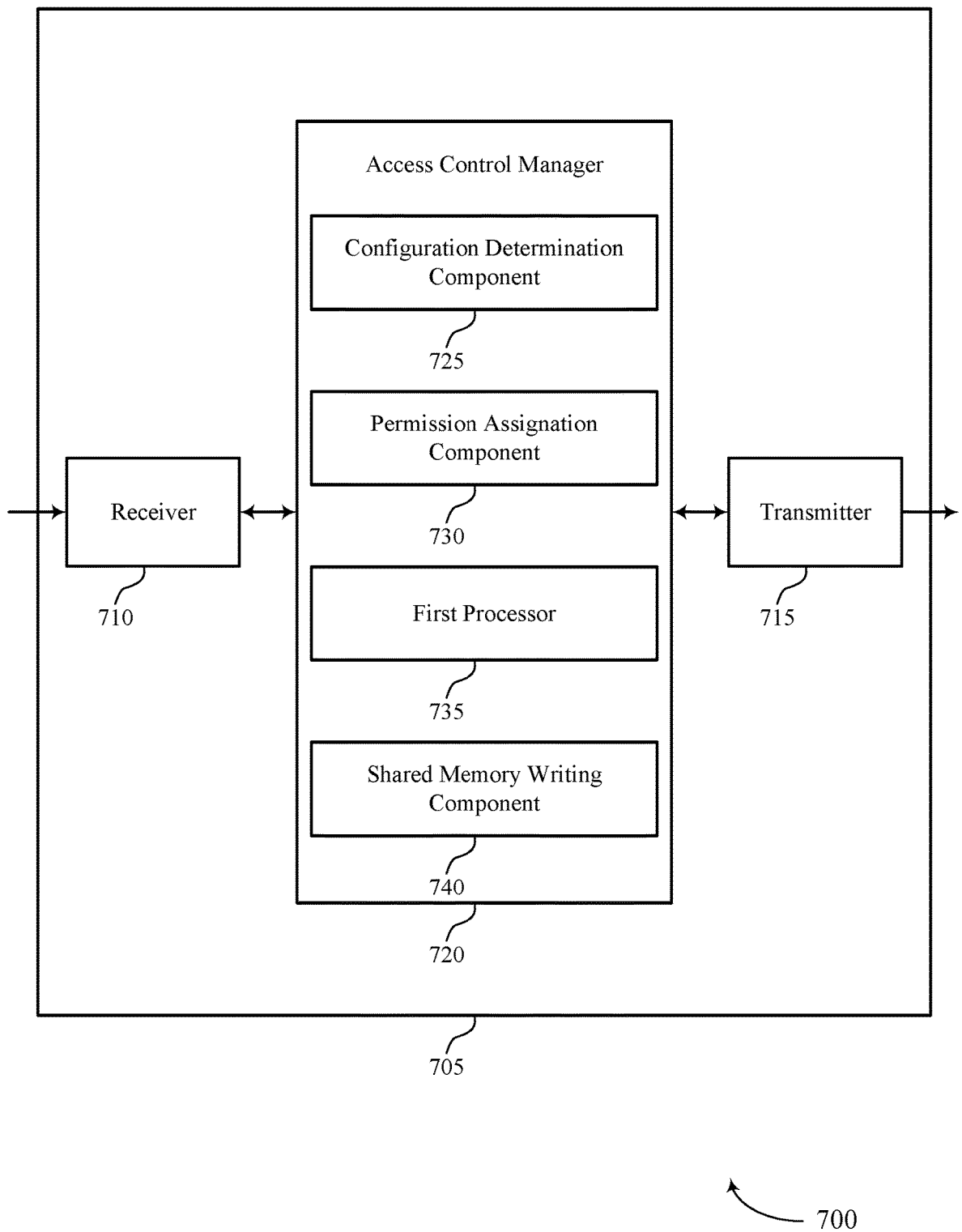

FIG. 7 shows a block diagram 700 of a device 705 that supports access control configurations for shared memory in accordance with aspects of the present disclosure. The device 705 may be an example of aspects of a device 605 or a device 105 as described herein. The device 705 may include a receiver 710, a transmitter 715, and an access control manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to access control configurations for shared memory). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to access control configurations for shared memory). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of access control configurations for shared memory as described herein. For example, the access control manager 720 may include a configuration determination component 725, a permission assignation component 730, a first processor 735, a shared memory writing component 740, or any combination thereof. The access control manager 720 may be an example of aspects of a access control manager 620 as described herein. In some examples, the access control manager 720, or various components thereof, may be configured to perform various operations (e.g., receiving, monitoring, transmitting) using or otherwise in cooperation with the receiver 710, the transmitter 715, or both. For example, the access control manager 720 may receive information from the receiver 710, send information to the transmitter 715, or be integrated in combination with the receiver 710, the transmitter 715, or both to receive information, transmit information, or perform various other operations as described herein.

The access control manager 720 may support managing access control at a shared memory of the device 605 in accordance with examples as disclosed herein. The configuration determination component 725 may be configured as or otherwise support a means for determining a configuration for a memory component of the device 605, the configuration indicating a set of multiple processors that share the memory component and indicating one or more permissions for a memory resource of the memory component. The permission assignation component 730 may be configured as or otherwise support a means for assigning, to a first processor of the set of multiple processors, a permission to write to the memory resource based on the configuration. The first processor 735 may be configured as or otherwise support a means for writing first information to the memory resource by the first processor based on the assigned permission to the first processor. The shared memory writing component 740 may be configured as or otherwise support a means for preventing a second processor of the set of multiple processors and a remainder of the set of multiple processors from writing to the memory resource based on the assigned permission to the first processor.

Figure 8:
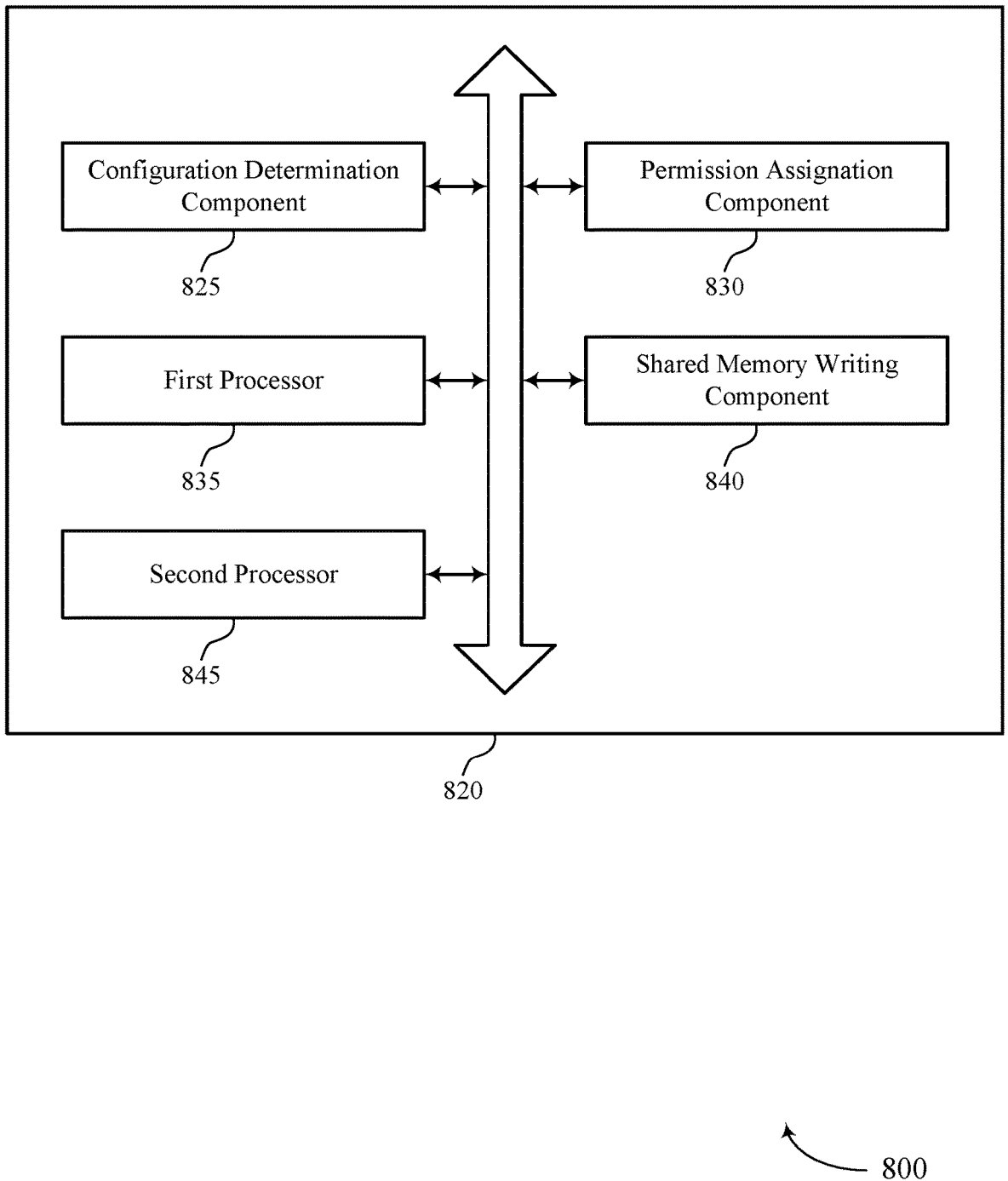
FIG. 8 shows a block diagram of an access control manager that supports access control configurations for shared memory in accordance with aspects of the present disclosure.

FIG. 8 shows a block diagram 800 of an access control manager 820 that supports access control configurations for shared memory in accordance with aspects of the present disclosure. The access control manager 820 may be an example of aspects of an access control manager 620, an access control manager 720, or both, as described herein. The access control manager 820, or various components thereof, may be an example of means for performing various aspects of access control configurations for shared memory as described herein. For example, the access control manager 820 may include a configuration determination component 825, a permission assignation component 830, a first processor 835, a shared memory writing component 840, a second processor 845, or any combination thereof. Each of these components may communicate, directly or indirectly, with one another (e.g., via one or more buses).

The access control manager 820 may support managing access control at a shared memory of a device in accordance with examples as disclosed herein. The configuration determination component 825 may be configured as or otherwise support a means for determining a configuration for a memory component of the device, the configuration indicating a set of multiple processors that share the memory component and indicating one or more permissions for a memory resource of the memory component. The permission assignation component 830 may be configured as or otherwise support a means for assigning, to a first processor of the set of multiple processors, a permission to write to the memory resource based on the configuration. The first processor 835 may be configured as or otherwise support a means for writing first information to the memory resource by the first processor based on the assigned permission to the first processor. The shared memory writing component 840 may be configured as or otherwise support a means for preventing a second processor of the set of multiple processors and a remainder of the set of multiple processors from writing to the memory resource based on the assigned permission to the first processor.

In some examples, the second processor 845 may be configured as or otherwise support a means for reading the first information from the memory resource by the second processor based on writing the first information to the memory resource by the first processor. In some examples, the second processor 845 may be configured as or otherwise support a means for determining a validity of the first information by the second processor based on the reading of the first information from the memory resource by the second processor. In some examples, to support reading the first information, the second processor 845 may be configured as or otherwise support a means for reading, by the second processor, a value indicative of the permission from a field of a table associated with the configuration, where the field corresponds to the memory resource.

In some examples, the permission assignation component 830 may be configured as or otherwise support a means for assigning, to the second processor, the permission to write to the memory resource based on writing the first information to the memory resource by the first processor. In some examples, the shared memory writing component 840 may be configured as or otherwise support a means for preventing the first processor and the remainder of the set of multiple processors from writing to the memory resource based on the assigned permission to the second processor. In some examples, the second processor 845 may be configured as or otherwise support a means for writing, to the memory resource and by the second processor, second information in response to the first information based on the assigned permission to the second processor.

In some examples, the permission assignation component 830 may be configured as or otherwise support a means for assigning, to the first processor by the second processor, the permission to write to the memory resource based on writing the second information. In some examples, the shared memory writing component 840 may be configured as or otherwise support a means for preventing the second processor and the remainder of the set of multiple processors from writing to the memory resource based on the assigned permission to the first processor.

In some examples, to support assigning the permission to the second processor, the first processor 835 may be configured as or otherwise support a means for writing, by the first processor, a value indicative of the permission to a field of a table associated with the configuration, where the field corresponds to the memory resource. In some examples, the table includes a set of multiple rows, each row corresponding to a respective memory resource and including a set of parameters indicative of the respective memory resource within the memory component. In some examples, writing the value indicative of the permission is based on the assigned permission to the first processor.

In some examples, the permission assignation component 830 may be configured as or otherwise support a means for resetting the permission to write to the memory resource, where each of the set of multiple processors is operable to write to the memory resource based on the reset permission.

Figure 9:
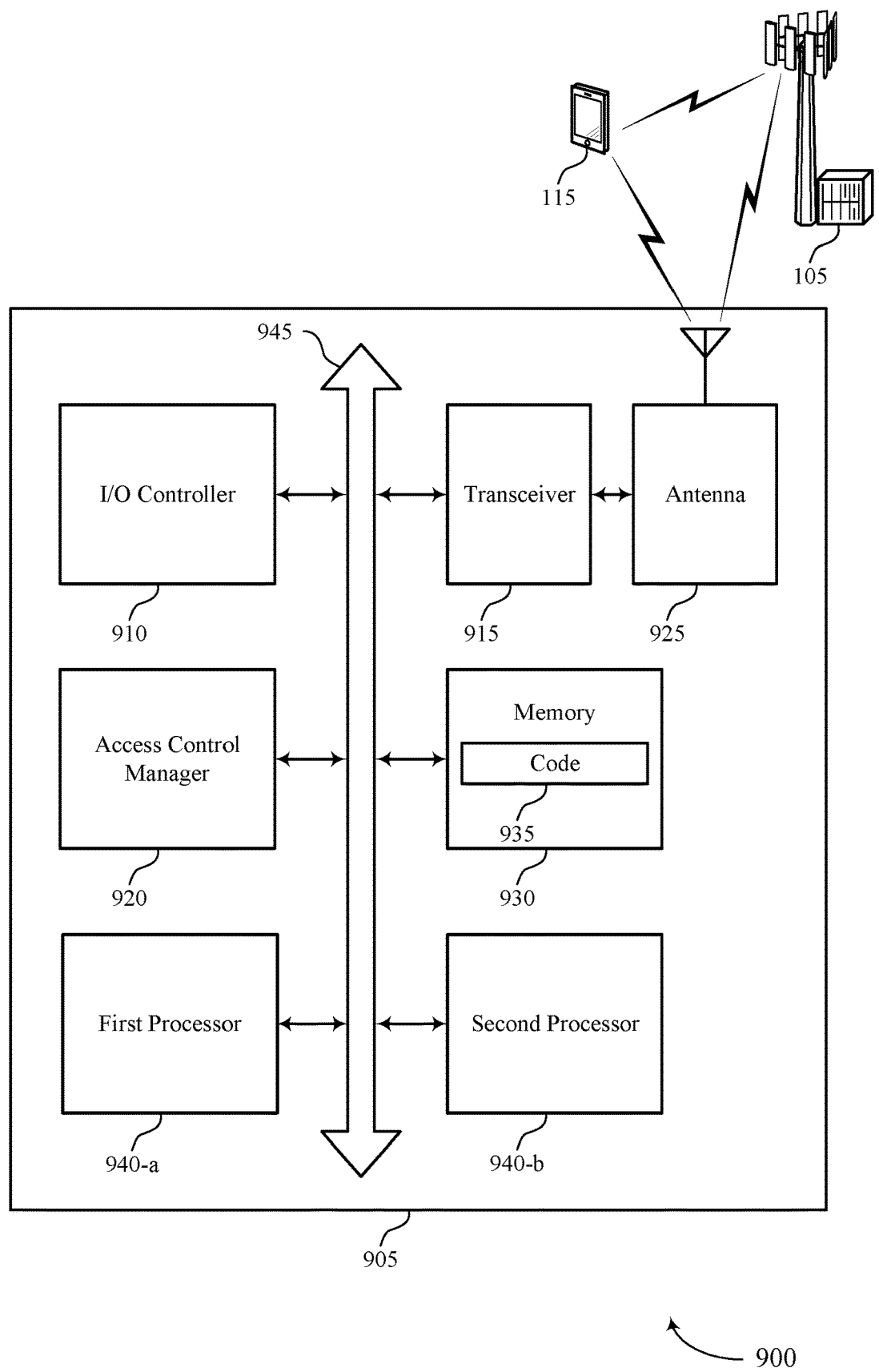
FIG. 9 shows a diagram of a system including a device that supports access control configurations for shared memory in accordance with aspects of the present disclosure.

FIG. 9 shows a diagram of a system 900 including a device 905 that supports access control configurations for shared memory in accordance with aspects of the present disclosure. The device 905 may be an example of or include the components of a device 605, a device 705, or a device as described herein. The device 905 may include components for bi-directional voice and data communications including components for transmitting and receiving communications, such as an access control manager 920, an I/O controller 910, a transceiver 915, an antenna 925, a memory 930, code 935, and multiple processors 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940-*a* or a processor 840-*b*, or both. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor(s) 940, cause the device 905 to perform various functions described herein. The code 935 may be stored in a non-transitory computer-readable medium such as system memory or another type of memory. In some cases, the code 935 may not be directly executable by the processor(s) 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor(s) 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor(s) 940 may be configured to operate a memory array using a memory controller. In some other cases, a memory controller may be integrated into the processor(s) 940. The processor(s) 940 may be configured to execute computer-readable instructions stored in a memory (e.g., the memory 930) to cause the device 905 to perform various functions (e.g., functions or tasks supporting access control configurations for shared memory). For example, the device 905 or a component of the device 905 may include one or more processors 940 and memory 930 coupled to the processor(s) 940, the processor(s) 940 and memory 930 configured to perform various functions described herein.

The access control manager 920 may support managing access control at a shared memory of a device in accordance with examples as disclosed herein. For example, the access control manager 920 may be configured as or otherwise support a means for determining a configuration for a memory component of the device 905, the configuration indicating a set of multiple processors that share the memory component and indicating one or more permissions for a memory resource of the memory component. The access control manager 920 may be configured as or otherwise support a means for assigning, to a first processor (e.g., the processor 940-*a*) of the set of multiple processors, a permission to write to the memory resource based on the configuration. The access control manager 920 may be configured as or otherwise support a means for writing first information to the memory resource by the first processor (e.g., the processor 940-*a*) based on the assigned permission to the first processor (e.g., the processor 940-*a*). The access control manager 920 may be configured as or otherwise support a means for preventing a second processor (e.g., the processor 940-*b*) of the set of multiple processors and a remainder of the set of multiple processors from writing to the memory resource based on the assigned permission to the first processor (e.g., the processor 940-*a*).

In some examples, the access control manager 920 may be configured to perform various operations (e.g., receiving, monitoring, transmitting) using or otherwise in cooperation with the transceiver 915, the one or more antennas 925, or any combination thereof. Although the access control manager 920 is illustrated as a separate component, in some examples, one or more functions described with reference to the access control manager 920 may be supported by or performed by the processor(s) 940, the memory 930, the code 935, or any combination thereof. For example, the code 935 may include instructions executable by the processor(s) 940 to cause the device 905 to perform various aspects of access control configurations for shared memory as described herein, or the processor(s) 940 and the memory 930 may be otherwise configured to perform or support such operations.

Figure 10:
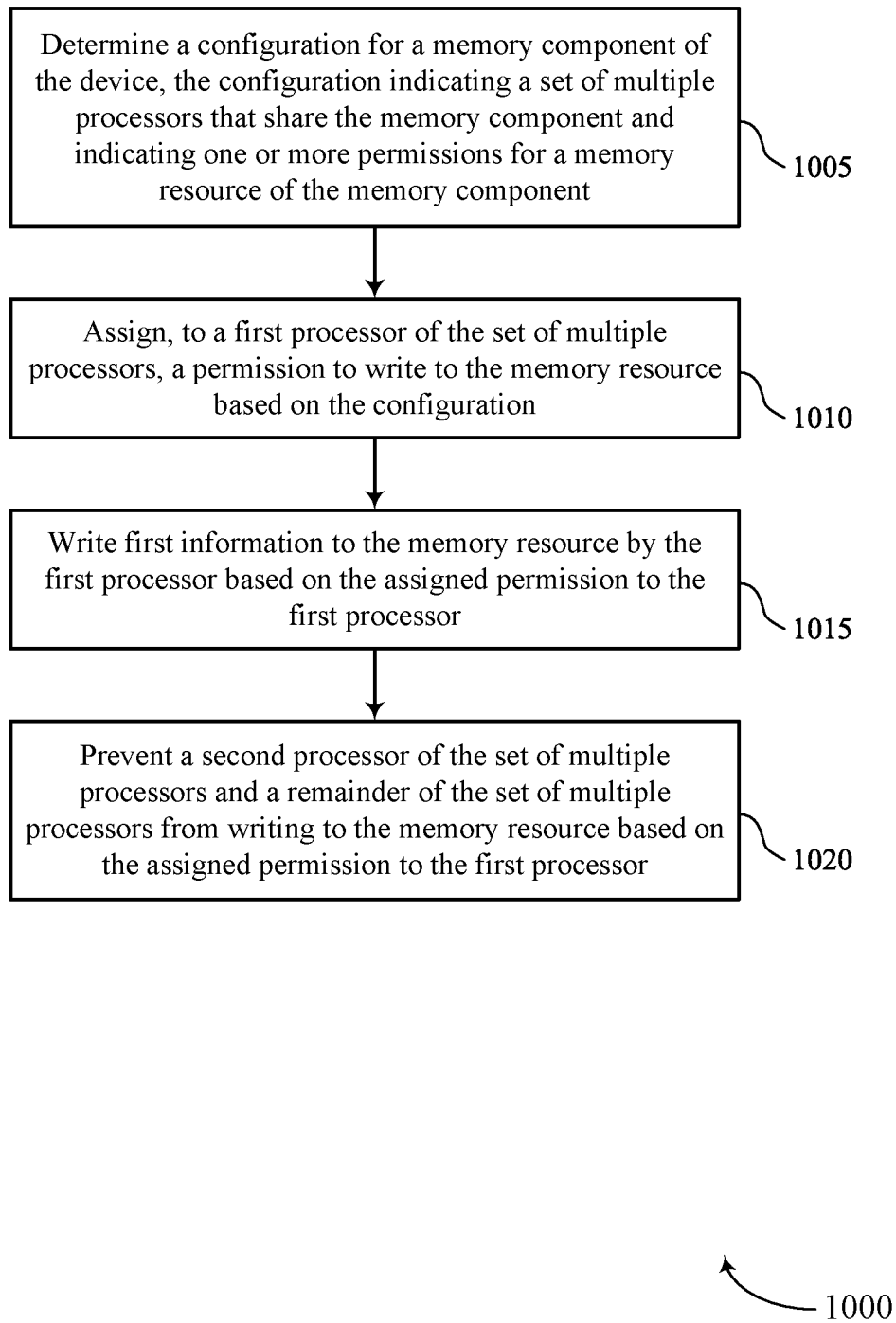
FIGS. 10 through 12 show flowcharts illustrating methods that support access control configurations for shared memory in accordance with aspects of the present disclosure.

FIG. 10 shows a flowchart illustrating a method 1000 that supports access control configurations for shared memory in accordance with aspects of the present disclosure. The operations of the method 1000 may be implemented by a device or its components as described herein. For example, the operations of the method 1000 may be performed by a device as described with reference to FIGS. 1 through 9. In some examples, a device may execute a set of instructions to control the functional elements of the device to perform the described functions. Additionally or alternatively, the device may perform aspects of the described functions using special-purpose hardware.

At 1005, the method may include determining a configuration for a memory component of the device, the configuration indicating a set of multiple processors that share the memory component and indicating one or more permissions for a memory resource of the memory component. The operations of 1005 may be performed in accordance with examples as disclosed herein. In some examples, aspects of the operations of 1005 may be performed by a configuration determination component 825 as described with reference to FIG. 8.

At 1010, the method may include assigning, to a first processor of the set of multiple processors, a permission to write to the memory resource based on the configuration. The operations of 1010 may be performed in accordance with examples as disclosed herein. In some examples, aspects of the operations of 1010 may be performed by a permission assignation component 830 as described with reference to FIG. 8.

At 1015, the method may include writing first information to the memory resource by the first processor based on the assigned permission to the first processor. The operations of 1015 may be performed in accordance with examples as disclosed herein. In some examples, aspects of the operations of 1015 may be performed by a first processor 835 as described with reference to FIG. 8.

At 1020, the method may include preventing a second processor of the set of multiple processors and a remainder of the set of multiple processors from writing to the memory resource based on the assigned permission to the first processor. The operations of 1020 may be performed in accordance with examples as disclosed herein. In some examples, aspects of the operations of 1020 may be performed by a shared memory writing component 840 as described with reference to FIG. 8.

Figure 11:
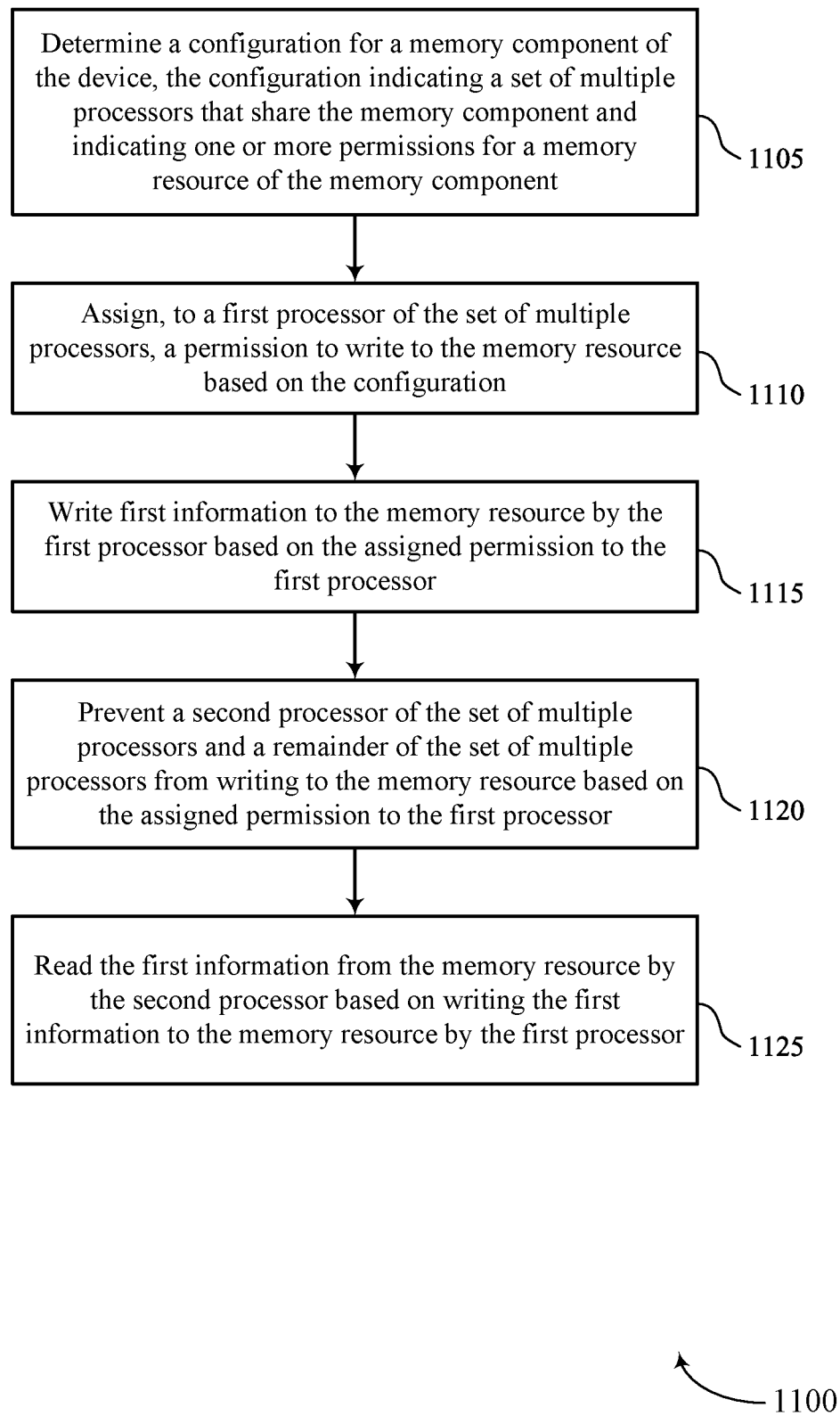

FIG. 11 shows a flowchart illustrating a method 1100 that supports access control configurations for shared memory in accordance with aspects of the present disclosure. The operations of the method 1100 may be implemented by a device or its components as described herein. For example, the operations of the method 1100 may be performed by a device as described with reference to FIGS. 1 through 9. In some examples, a device may execute a set of instructions to control the functional elements of the device to perform the described functions. Additionally or alternatively, the device may perform aspects of the described functions using special-purpose hardware.

At 1105, the method may include determining a configuration for a memory component of the device, the configuration indicating a set of multiple processors that share the memory component and indicating one or more permissions for a memory resource of the memory component. The operations of 1105 may be performed in accordance with examples as disclosed herein. In some examples, aspects of the operations of 1105 may be performed by a configuration determination component 825 as described with reference to FIG. 8.

At 1110, the method may include assigning, to a first processor of the set of multiple processors, a permission to write to the memory resource based on the configuration. The operations of 1110 may be performed in accordance with examples as disclosed herein. In some examples, aspects of the operations of 1110 may be performed by a permission assignation component 830 as described with reference to FIG. 8.

At 1115, the method may include writing first information to the memory resource by the first processor based on the assigned permission to the first processor. The operations of 1115 may be performed in accordance with examples as disclosed herein. In some examples, aspects of the operations of 1115 may be performed by a first processor 835 as described with reference to FIG. 8.

At 1120, the method may include preventing a second processor of the set of multiple processors and a remainder of the set of multiple processors from writing to the memory resource based on the assigned permission to the first processor. The operations of 1120 may be performed in accordance with examples as disclosed herein. In some examples, aspects of the operations of 1120 may be performed by a shared memory writing component 840 as described with reference to FIG. 8.

At 1125, the method may include reading the first information from the memory resource by the second processor based on writing the first information to the memory resource by the first processor. The operations of 1125 may be performed in accordance with examples as disclosed herein. In some examples, aspects of the operations of 1125 may be performed by a second processor 845 as described with reference to FIG. 8.

Figure 12:
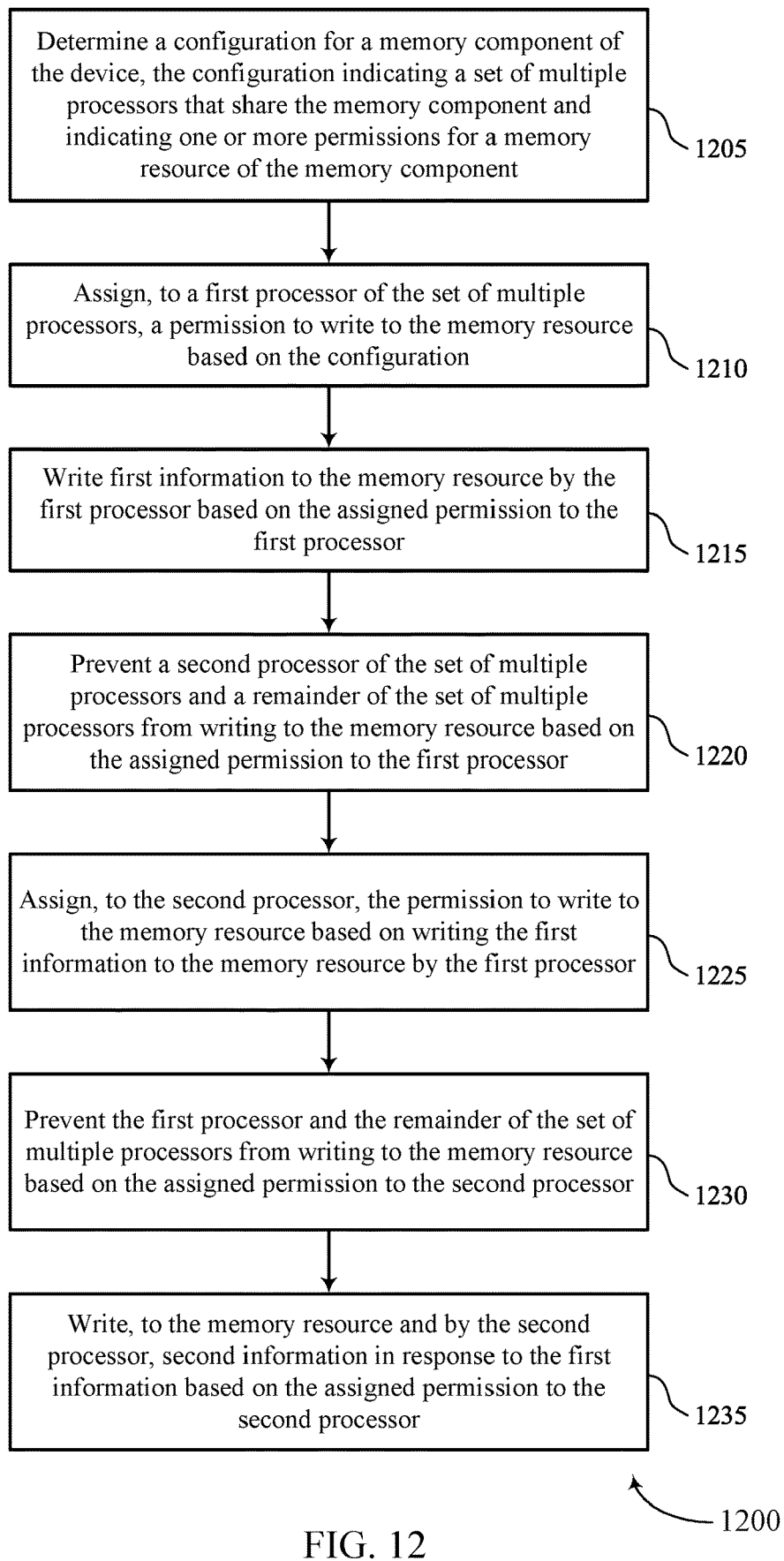

FIG. 12 shows a flowchart illustrating a method 1200 that supports access control configurations for shared memory in accordance with aspects of the present disclosure. The operations of the method 1200 may be implemented by a device or its components as described herein. For example, the operations of the method 1200 may be performed by a device as described with reference to FIGS. 1 through 9. In some examples, a device may execute a set of instructions to control the functional elements of the device to perform the described functions. Additionally or alternatively, the device may perform aspects of the described functions using special-purpose hardware.

At 1205, the method may include determining a configuration for a memory component of the device, the configuration indicating a set of multiple processors that share the memory component and indicating one or more permissions for a memory resource of the memory component. The operations of 1205 may be performed in accordance with examples as disclosed herein. In some examples, aspects of the operations of 1205 may be performed by a configuration determination component 825 as described with reference to FIG. 8.

At 1210, the method may include assigning, to a first processor of the set of multiple processors, a permission to write to the memory resource based on the configuration. The operations of 1210 may be performed in accordance with examples as disclosed herein. In some examples, aspects of the operations of 1210 may be performed by a permission assignation component 830 as described with reference to FIG. 8.

At 1215, the method may include writing first information to the memory resource by the first processor based on the assigned permission to the first processor. The operations of 1215 may be performed in accordance with examples as disclosed herein. In some examples, aspects of the operations of 1215 may be performed by a first processor 835 as described with reference to FIG. 8.

At 1220, the method may include preventing a second processor of the set of multiple processors and a remainder of the set of multiple processors from writing to the memory resource based on the assigned permission to the first processor. The operations of 1220 may be performed in accordance with examples as disclosed herein. In some examples, aspects of the operations of 1220 may be performed by a shared memory writing component 840 as described with reference to FIG. 8.

At 1225, the method may include assigning, to the second processor, the permission to write to the memory resource based on writing the first information to the memory resource by the first processor. The operations of 1225 may be performed in accordance with examples as disclosed herein. In some examples, aspects of the operations of 1225 may be performed by a permission assignation component 830 as described with reference to FIG. 8.

At 1230, the method may include preventing the first processor and the remainder of the set of multiple processors from writing to the memory resource based on the assigned permission to the second processor. The operations of 1230 may be performed in accordance with examples as disclosed herein. In some examples, aspects of the operations of 1230 may be performed by a shared memory writing component 840 as described with reference to FIG. 8.

At 1235, the method may include writing, to the memory resource and by the second processor, second information in response to the first information based on the assigned permission to the second processor. The operations of 1235 may be performed in accordance with examples as disclosed herein. In some examples, aspects of the operations of 1235 may be performed by a second processor 845 as described with reference to FIG. 8.

Figure 13:
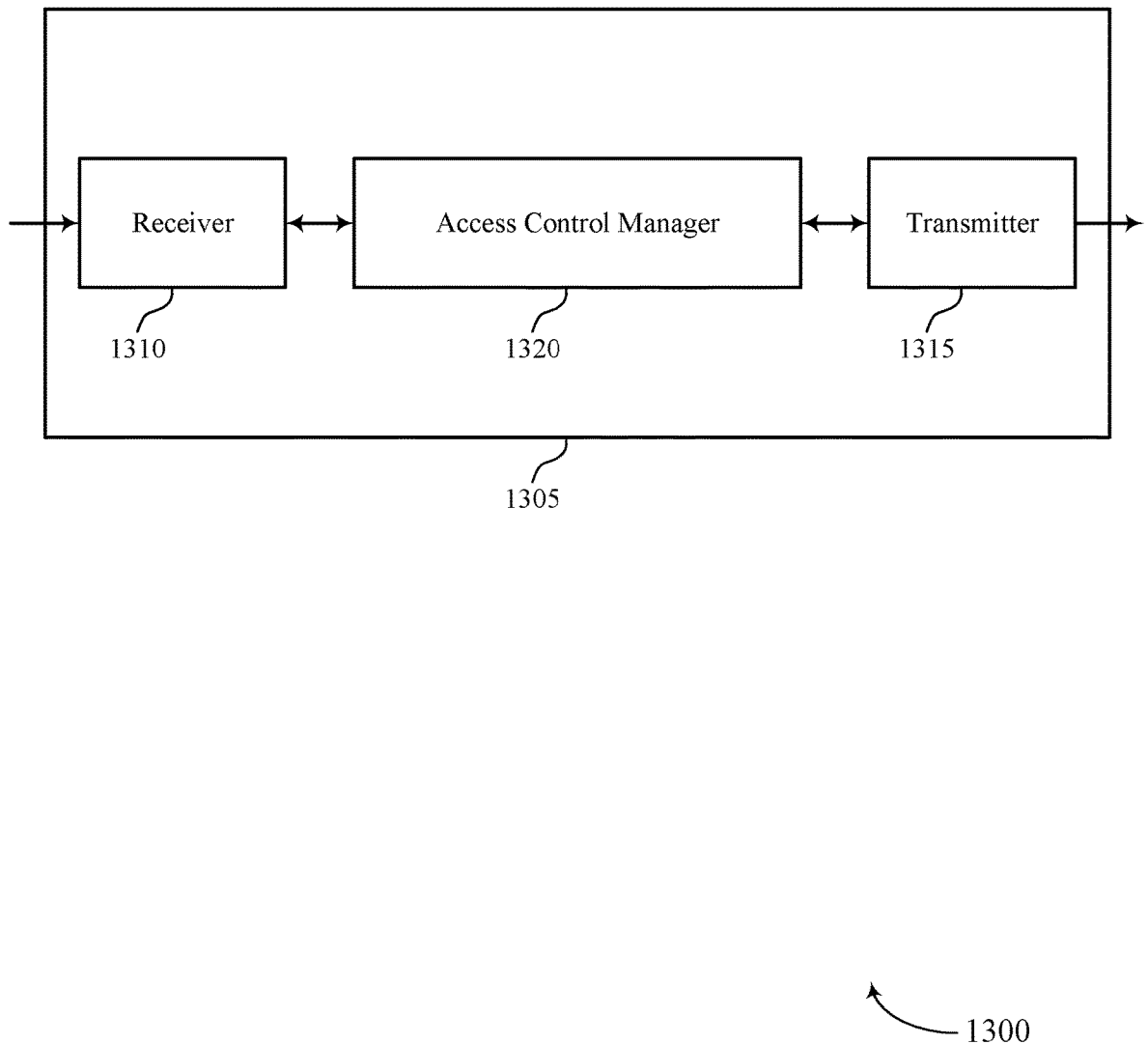
FIGS. 13 and 14 show block diagrams of devices that support access control configurations for shared memory in accordance with aspects of the present disclosure.

FIG. 13 shows a block diagram 1300 of a device 1305 that supports access control configurations for shared memory in accordance with aspects of the present disclosure. The device 1305 may be an example of aspects of a device as described herein. The device 1305 may include a receiver 1310, a transmitter 1315, and an access control manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to access control configurations for shared memory). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to access control configurations for shared memory). In some examples, the transmitter 1315 may be co-located with a receiver 1310 in a transceiver module. The transmitter 1315 may utilize a single antenna or a set of multiple antennas.

The access control manager 1320, the receiver 1310, the transmitter 1315, or various combinations thereof or various components thereof may be examples of means for performing various aspects of access control configurations for shared memory as described herein. For example, the access control manager 1320, the receiver 1310, the transmitter 1315, or various combinations or components thereof may support a method for performing one or more of the functions described herein.

In some examples, the access control manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the access control manager 1320, the receiver 1310, the transmitter 1315, or various combinations or components thereof may be implemented in code (e.g., as communications management software or firmware) executed by a processor. If implemented in code executed by a processor, the functions of the access control manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the access control manager 1320 may be configured to perform various operations (e.g., receiving, monitoring, transmitting) using or otherwise in cooperation with the receiver 1310, the transmitter 1315, or both. For example, the access control manager 1320 may receive information from the receiver 1310, send information to the transmitter 1315, or be integrated in combination with the receiver 1310, the transmitter 1315, or both to receive information, transmit information, or perform various other operations as described herein.

The access control manager 1320 may support memory management at a device in accordance with examples as disclosed herein. For example, the access control manager 1320 may be configured as or otherwise support a means for determining a configuration for a memory component of the device, the configuration indicating a set of multiple processors that share the memory component and indicating one or more permissions for a first memory resource of the memory component. The access control manager 1320 may be configured as or otherwise support a means for allocating a second memory resource of the memory component by allocating a sub-region of the first memory resource to the second memory resource. The access control manager 1320 may be configured as or otherwise support a means for assigning, to a first processor of the set of multiple processors, a permission to write to the second memory resource based on allocating the sub-region of the first memory resource to the second memory resource. The access control manager 1320 may be configured as or otherwise support a means for preventing a second processor of the set of multiple processors from writing to the second memory resource based on the assigned permission to the first processor.

Additionally or alternatively, the access control manager 1320 may support memory management in accordance with examples as disclosed herein. For example, the access control manager 1320 may be configured as or otherwise support a means for a set of multiple processors. The access control manager 1320 may be configured as or otherwise support a means for memory coupling with each of the set of multiple processors. The access control manager 1320 may be configured as or otherwise support a means for instructions storing in the memory and executable by the set of multiple processors to cause the apparatus to. The access control manager 1320 may be configured as or otherwise support a means for determining a configuration for a memory component of the apparatus, the configuration indicating that the set of multiple processors share the memory component and indicating one or more permissions for a first memory resource of the memory component. The access control manager 1320 may be configured as or otherwise support a means for allocating a second memory resource of the memory component by allocating a sub-region of the first memory resource to the second memory resource. The access control manager 1320 may be configured as or otherwise support a means for assigning, to a first processor of the set of multiple processors, a permission to write to the second memory resource based on allocating the sub-region of the first memory resource to the second memory resource. The access control manager 1320 may be configured as or otherwise support a means for preventing a second processor of the set of multiple processors from writing to the second memory resource based on the assigned permission to the first processor.

Additionally or alternatively, the access control manager 1320 may support memory management in accordance with examples as disclosed herein. For example, the access control manager 1320 may be configured as or otherwise support a means for determining a configuration for a memory component of the apparatus, the configuration indicating a set of multiple processors that share the memory component and indicating one or more permissions for a first memory resource of the memory component. The access control manager 1320 may be configured as or otherwise support a means for allocating a second memory resource of the memory component by allocating a sub-region of the first memory resource to the second memory resource. The access control manager 1320 may be configured as or otherwise support a means for assigning, to a first processor of the set of multiple processors, a permission to writing to the second memory resource based on allocating the sub-region of the first memory resource to the second memory resource. The access control manager 1320 may be configured as or otherwise support a means for preventing a second processor of the set of multiple processors from writing to the second memory resource based on the assigned permission to the first processor.

Figure 14:
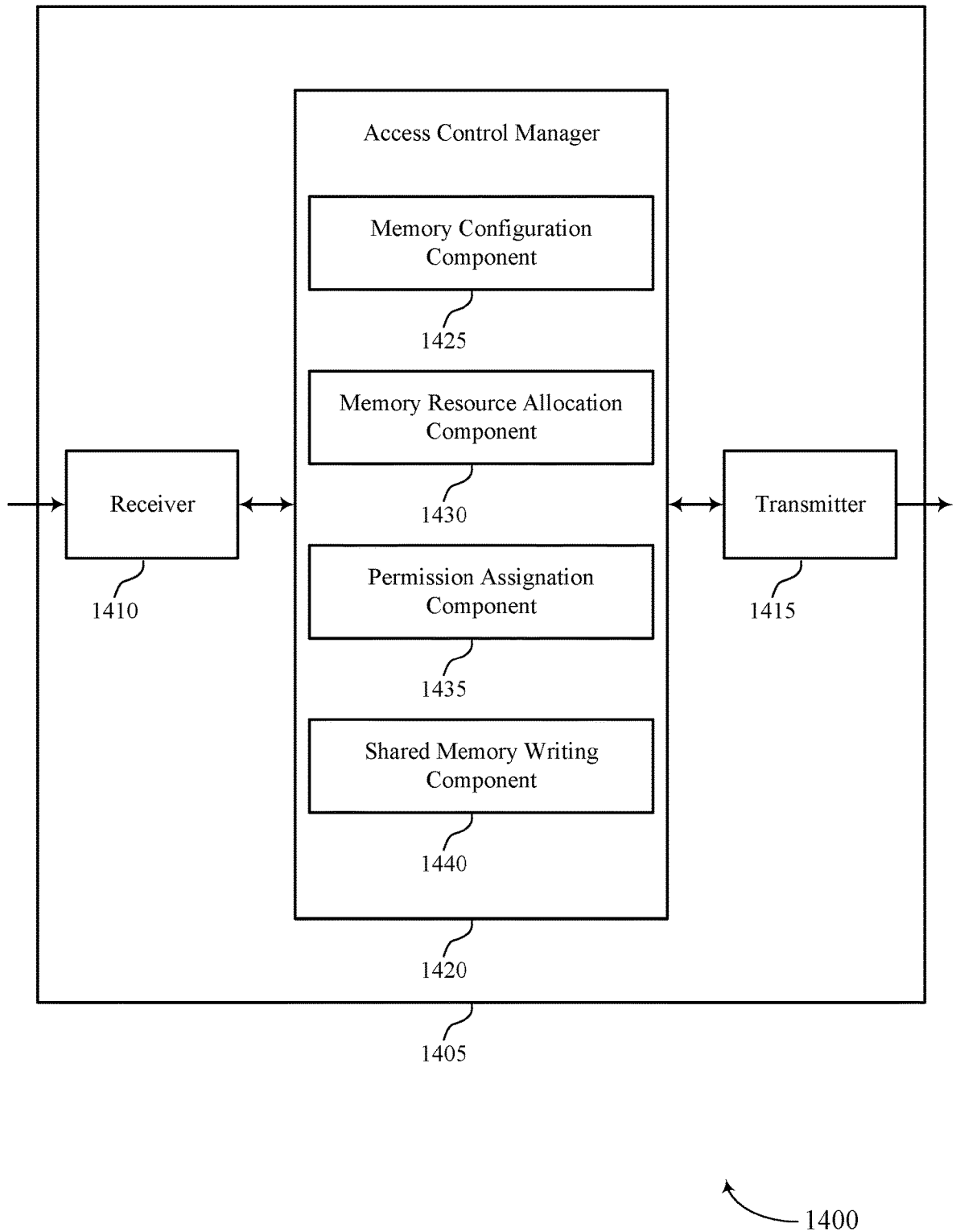

FIG. 14 shows a block diagram 1400 of a device 1405 that supports access control configurations for shared memory in accordance with aspects of the present disclosure. The device 1405 may be an example of aspects of a device 1305 or a device 115 as described herein. The device 1405 may include a receiver 1410, a transmitter 1415, and an access control manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to access control configurations for shared memory). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to access control configurations for shared memory). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of access control configurations for shared memory as described herein. For example, the access control manager 1420 may include a memory configuration component 1425, a memory resource allocation component 1430, a permission assignation component 1435, a shared memory writing component 1440, or any combination thereof. The access control manager 1420 may be an example of aspects of a access control manager 1320 as described herein. In some examples, the access control manager 1420, or various components thereof, may be configured to perform various operations (e.g., receiving, monitoring, transmitting) using or otherwise in cooperation with the receiver 1410, the transmitter 1415, or both. For example, the access control manager 1420 may receive information from the receiver 1410, send information to the transmitter 1415, or be integrated in combination with the receiver 1410, the transmitter 1415, or both to receive information, transmit information, or perform various other operations as described herein.

The access control manager 1420 may support memory management at a device in accordance with examples as disclosed herein. The memory configuration component 1425 may be configured as or otherwise support a means for determining a configuration for a memory component of the device, the configuration indicating a set of multiple processors that share the memory component and indicating one or more permissions for a first memory resource of the memory component. The memory resource allocation component 1430 may be configured as or otherwise support a means for allocating a second memory resource of the memory component by allocating a sub-region of the first memory resource to the second memory resource. The permission assignation component 1435 may be configured as or otherwise support a means for assigning, to a first processor of the set of multiple processors, a permission to write to the second memory resource based on allocating the sub-region of the first memory resource to the second memory resource. The shared memory writing component 1440 may be configured as or otherwise support a means for preventing a second processor of the set of multiple processors from writing to the second memory resource based on the assigned permission to the first processor.

Figure 15:
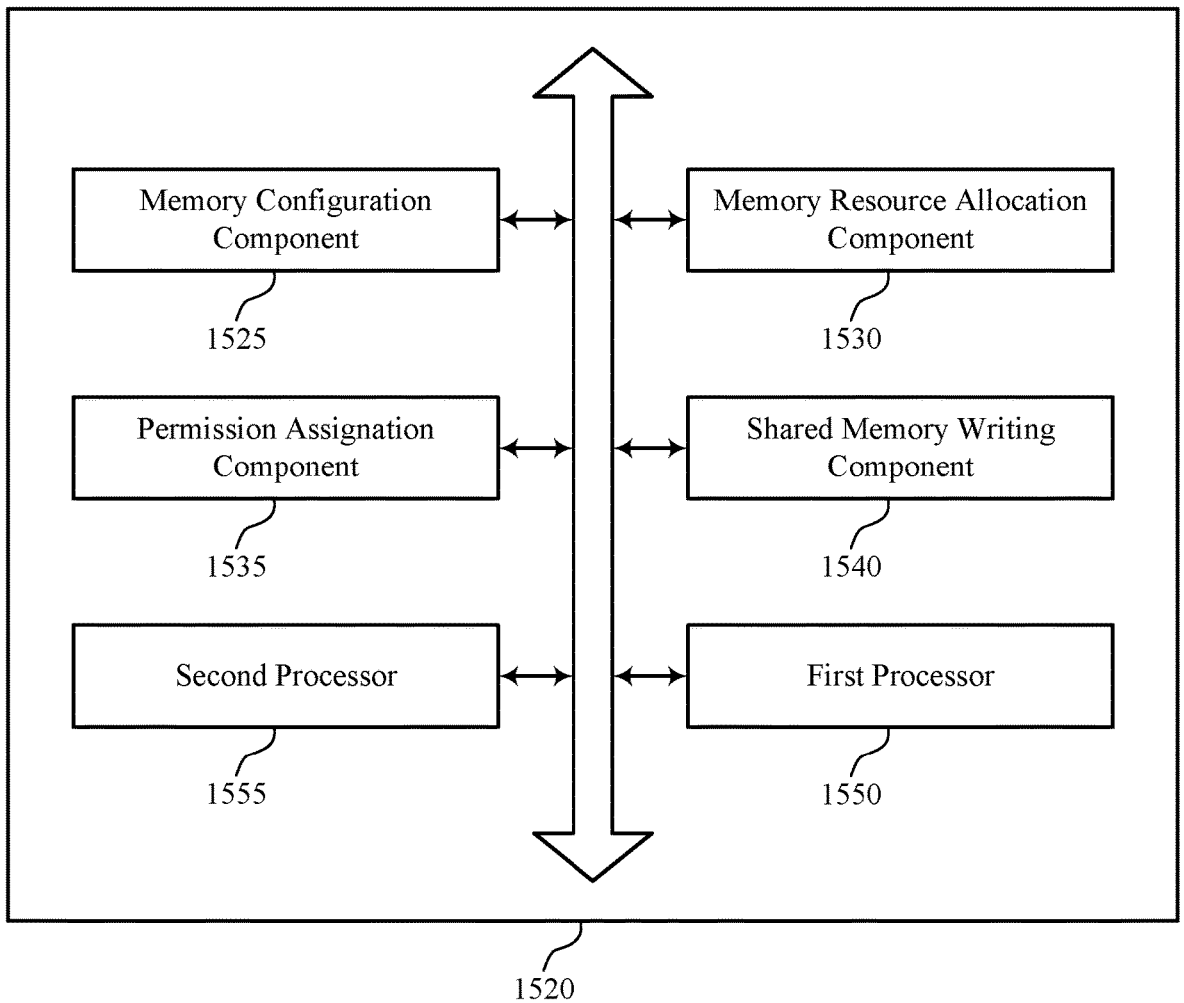
FIG. 15 shows a block diagram of an access control manager that supports access control configurations for shared memory in accordance with aspects of the present disclosure.

FIG. 15 shows a block diagram 1500 of an access control manager 1520 that supports access control configurations for shared memory in accordance with aspects of the present disclosure. The access control manager 1520 may be an example of aspects of an access control manager 1320, an access control manager 1420, or both, as described herein. The access control manager 1520, or various components thereof, may be an example of means for performing various aspects of access control configurations for shared memory as described herein. For example, the access control manager 1520 may include a memory configuration component 1525, a memory resource allocation component 1530, a permission assignation component 1535, a shared memory writing component 1540, a first processor 1550, a second processor 1555, or any combination thereof. Each of these components may communicate, directly or indirectly, with one another (e.g., via one or more buses).

The access control manager 1520 may support memory management at a device in accordance with examples as disclosed herein. The memory configuration component 1525 may be configured as or otherwise support a means for determining a configuration for a memory component of the device, the configuration indicating a set of multiple processors that share the memory component and indicating one or more permissions for a first memory resource of the memory component. The memory resource allocation component 1530 may be configured as or otherwise support a means for allocating a second memory resource of the memory component by allocating a sub-region of the first memory resource to the second memory resource. The permission assignation component 1535 may be configured as or otherwise support a means for assigning, to a first processor of the set of multiple processors, a permission to write to the second memory resource based on allocating the sub-region of the first memory resource to the second memory resource. The shared memory writing component 1540 may be configured as or otherwise support a means for preventing a second processor of the set of multiple processors from writing to the second memory resource based on the assigned permission to the first processor.

In some examples, the memory configuration component 1525 may be configured as or otherwise support a means for assigning the first processor to control the configuration of the second memory resource based on allocating the second memory resource.

In some examples, the memory configuration component 1525 may be configured as or otherwise support a means for updating, based on allocating the second memory resource of the memory component, an indication of a chain of delegation associated with the second memory resource to include the second processor, where the second processor is configured to control the configuration of the first memory resource.

In some examples, the first processor 1550 may be configured as or otherwise support a means for writing first information to the second memory resource by the first processor based on the assigned permission to the first processor.

In some examples, the second processor 1555 may be configured as or otherwise support a means for reading the first information from the second memory resource by the second processor based on writing the first information to the second memory resource by the first processor.

In some examples, the memory configuration component 1525 may be configured as or otherwise support a means for updating, based on allocating the second memory resource of the memory component, a data structure associated with the configuration of the memory component to include a second set of multiple fields associated with the second memory resource, the data structure further including a first set of multiple fields associated with the first memory resource.

In some examples, the first processor 1550 may be configured as or otherwise support a means for reading, by the first processor, a value indicative of the assigned permission to write to the second memory resource from a first field of the second set of multiple fields associated with the second memory resource.

In some examples, the second set of multiple fields includes respective fields indicating an address range of the second memory resource, read permissions for the second memory resource, the assigned permission to write to the second memory resource, a parent memory resource for the second memory resource, and a chain of delegation for the second memory resource. In some examples, the first set of multiple fields includes respective fields indicating an address range of the first memory resource, read permissions for the first memory resource, a permission to write to the first memory resource, and a chain of delegation for the first memory resource.

In some examples, the permission assignation component 1535 may be configured as or otherwise support a means for assigning, to the second processor, the assigned permission to write to the second memory resource. In some examples, the shared memory writing component 1540 may be configured as or otherwise support a means for preventing the first processor from writing to the second memory resource based on the assigned permission to the second processor.

In some examples, the memory configuration component 1525 may be configured as or otherwise support a means for updating an indication of a chain of delegation associated with the second memory resource to include the first processor based on the assigned permission to write to the second memory resource to the second processor.

In some examples, the second processor 1555 may be configured as or otherwise support a means for writing, to the second memory resource and by the second processor, second information based on the assigned permission to the second processor.

In some examples, the permission assignation component 1535 may be configured as or otherwise support a means for assigning, by the second processor to a third processor of the set of multiple processors, the assigned permission to write to the second memory resource. In some examples, the shared memory writing component 1540 may be configured as or otherwise support a means for preventing the first processor and the second processor from writing to the second memory resource based on the assigned permission to the third processor. In some examples, the memory configuration component 1525 may be configured as or otherwise support a means for updating an indication of a chain of delegation associated with the second memory resource to indicate the second processor based on the assigned permission to write to the second memory resource to the third processor.

Figure 16:
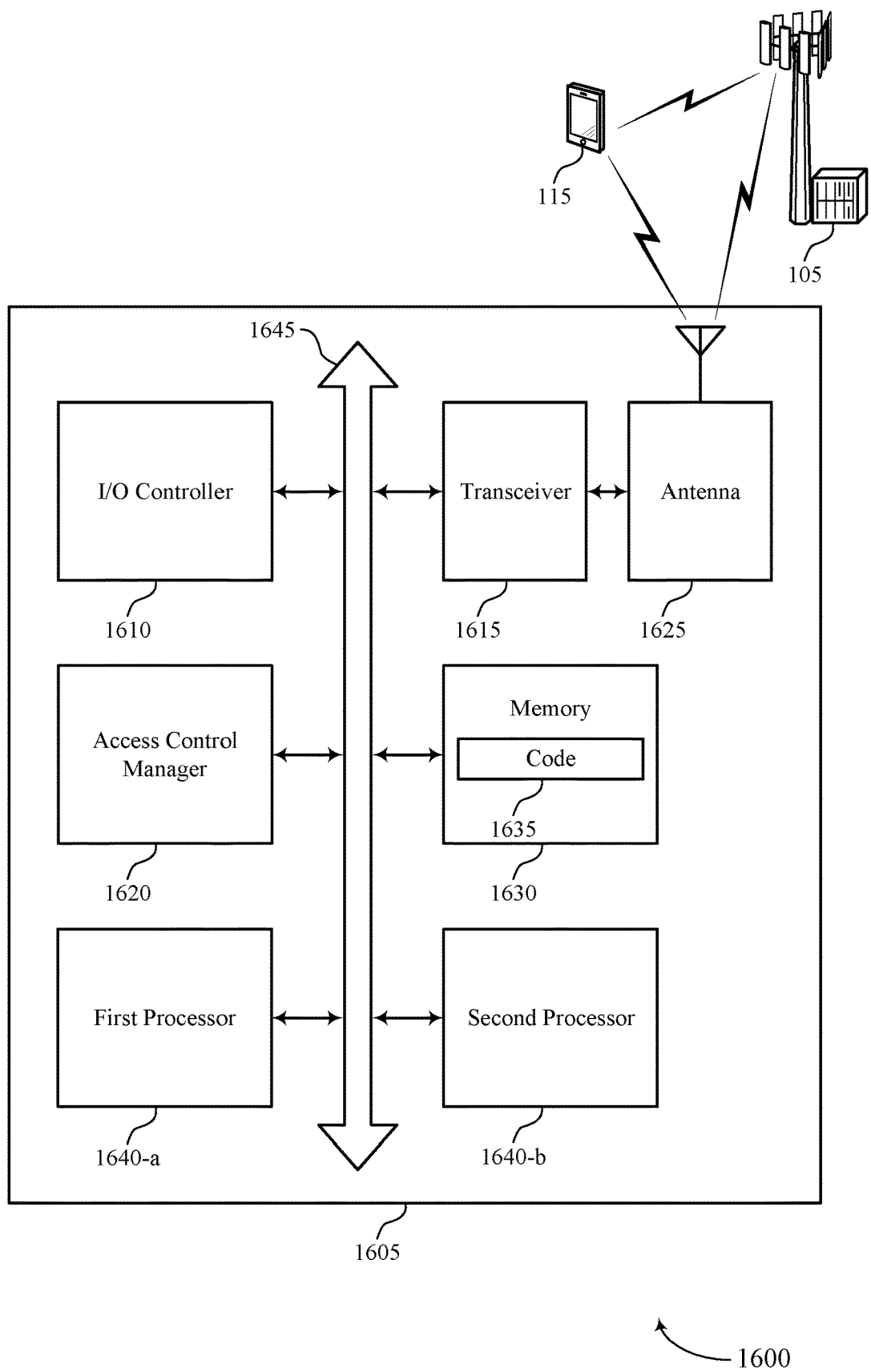
FIG. 16 shows a diagram of a system including a device that supports access control configurations for shared memory in accordance with aspects of the present disclosure.

FIG. 16 shows a diagram of a system 1600 including a device 1605 that supports access control configurations for shared memory in accordance with aspects of the present disclosure. The device 1605 may be an example of or include the components of a device 1305, a device 1405, or a device as described herein. The device 1605 may include components for bi-directional voice and data communications including components for transmitting and receiving communications, such as an access control manager 1620, an I/O controller 1610, a transceiver 1615, an antenna 1625, a memory 1630, code 1635, and two or more processors 1640. These components may be in electronic communication or otherwise coupled (e.g., operatively, communicatively, functionally, electronically, electrically) via one or more buses (e.g., a bus 1645).

The I/O controller 1610 may manage input and output signals for the device 1605. The I/O controller 1610 may also manage peripherals not integrated into the device 1605. In some cases, the I/O controller 1610 may represent a physical connection or port to an external peripheral. In some cases, the I/O controller 1610 may utilize an operating system such as iOS®, ANDROID®, MS-DOS®, MS-WINDOWS®, OS/2®, UNIX®, LINUX®, or another known operating system. Additionally or alternatively, the I/O controller 1610 may represent or interact with a modem, a keyboard, a mouse, a touchscreen, or a similar device. In some cases, the I/O controller 1610 may be implemented as part of a processor, such as the processor(s) 1640. In some cases, a user may interact with the device 1605 via the I/O controller 1610 or via hardware components controlled by the I/O controller 1610.

In some cases, the device 1605 may include a single antenna 1625. However, in some other cases, the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor(s) 1640, cause the device 1605 to perform various functions described herein. The code 1635 may be stored in a non-transitory computer-readable medium such as system memory or another type of memory. In some cases, the code 1635 may not be directly executable by the processor(s) 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor(s) 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor(s) 1640 may be configured to operate a memory array using a memory controller. In some other cases, a memory controller may be integrated into the processor(s) 1640. The processor(s) 1640 may be configured to execute computer-readable instructions stored in a memory (e.g., the memory 1630) to cause the device 1605 to perform various functions (e.g., functions or tasks supporting access control configurations for shared memory). For example, the device 1605 or a component of the device 1605 may include a processor(s) 1640 and memory 1630 coupled to the processor(s) 1640, the processor(s) 1640 and memory 1630 configured to perform various functions described herein.

The access control manager 1620 may support memory management at a device in accordance with examples as disclosed herein. For example, the access control manager 1620 may be configured as or otherwise support a means for determining a configuration for a memory component of the device, the configuration indicating a set of multiple processors that share the memory component and indicating one or more permissions for a first memory resource of the memory component. The access control manager 1620 may be configured as or otherwise support a means for allocating a second memory resource of the memory component by allocating a sub-region of the first memory resource to the second memory resource. The access control manager 1620 may be configured as or otherwise support a means for assigning, to a first processor (e.g., processor 1640-a) of the set of multiple processors, a permission to write to the second memory resource based on allocating the sub-region of the first memory resource to the second memory resource. The access control manager 1620 may be configured as or otherwise support a means for preventing a second processor (e.g., processor 1640-b) of the set of multiple processors from writing to the second memory resource based on the assigned permission to the first processor.

In some examples, the access control manager 1620 may be configured to perform various operations (e.g., receiving, monitoring, transmitting) using or otherwise in cooperation with the transceiver 1615, the one or more antennas 1625, or any combination thereof. Although the access control manager 1620 is illustrated as a separate component, in some examples, one or more functions described with reference to the access control manager 1620 may be supported by or performed by the processor(s) 1640, the memory 1630, the code 1635, or any combination thereof. For example, the code 1635 may include instructions executable by the processor(s) 1640 to cause the device 1605 to perform various aspects of access control configurations for shared memory as described herein, or the processor(s) 1640 and the memory 1630 may be otherwise configured to perform or support such operations.

Figure 17:
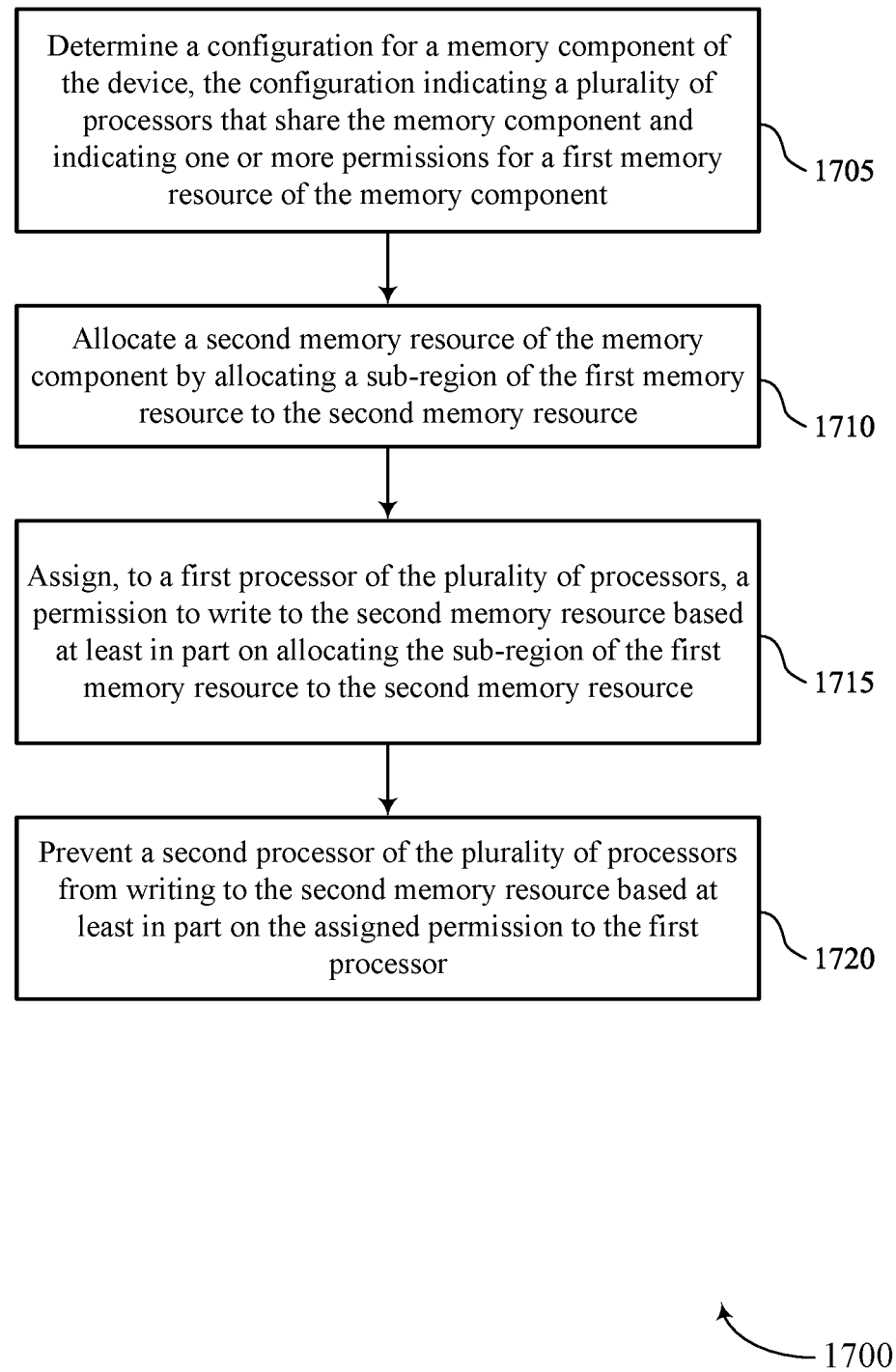
FIGS. 17 through 19 show flowcharts illustrating methods that support access control configurations for shared memory in accordance with aspects of the present disclosure.

FIG. 17 shows a flowchart illustrating a method 1700 that supports access control configurations for shared memory in accordance with aspects of the present disclosure. The operations of the method 1700 may be implemented by a device or its components as described herein. For example, the operations of the method 1700 may be performed by a device as described with reference to FIGS. 1 through 16. In some examples, a device may execute a set of instructions to control the functional elements of the device to perform the described functions. Additionally or alternatively, the device may perform aspects of the described functions using special-purpose hardware.

At 1705, the method may include determining a configuration for a memory component of the device, the configuration indicating a set of multiple processors that share the memory component and indicating one or more permissions for a first memory resource of the memory component. The operations of 1705 may be performed in accordance with examples as disclosed herein. In some examples, aspects of the operations of 1705 may be performed by a memory configuration component 1525 as described with reference to FIG. 15.

At 1710, the method may include allocating a second memory resource of the memory component by allocating a sub-region of the first memory resource to the second memory resource. The operations of 1710 may be performed in accordance with examples as disclosed herein. In some examples, aspects of the operations of 1710 may be performed by a memory resource allocation component 1530 as described with reference to FIG. 15.

At 1715, the method may include assigning, to a first processor of the set of multiple processors, a permission to write to the second memory resource based on allocating the sub-region of the first memory resource to the second memory resource. The operations of 1715 may be performed in accordance with examples as disclosed herein. In some examples, aspects of the operations of 1715 may be performed by a permission assignation component 1535 as described with reference to FIG. 15.

At 1720, the method may include preventing a second processor of the set of multiple processors from writing to the second memory resource based on the assigned permission to the first processor. The operations of 1720 may be performed in accordance with examples as disclosed herein. In some examples, aspects of the operations of 1720 may be performed by a shared memory writing component 1540 as described with reference to FIG. 15.

Figure 18:
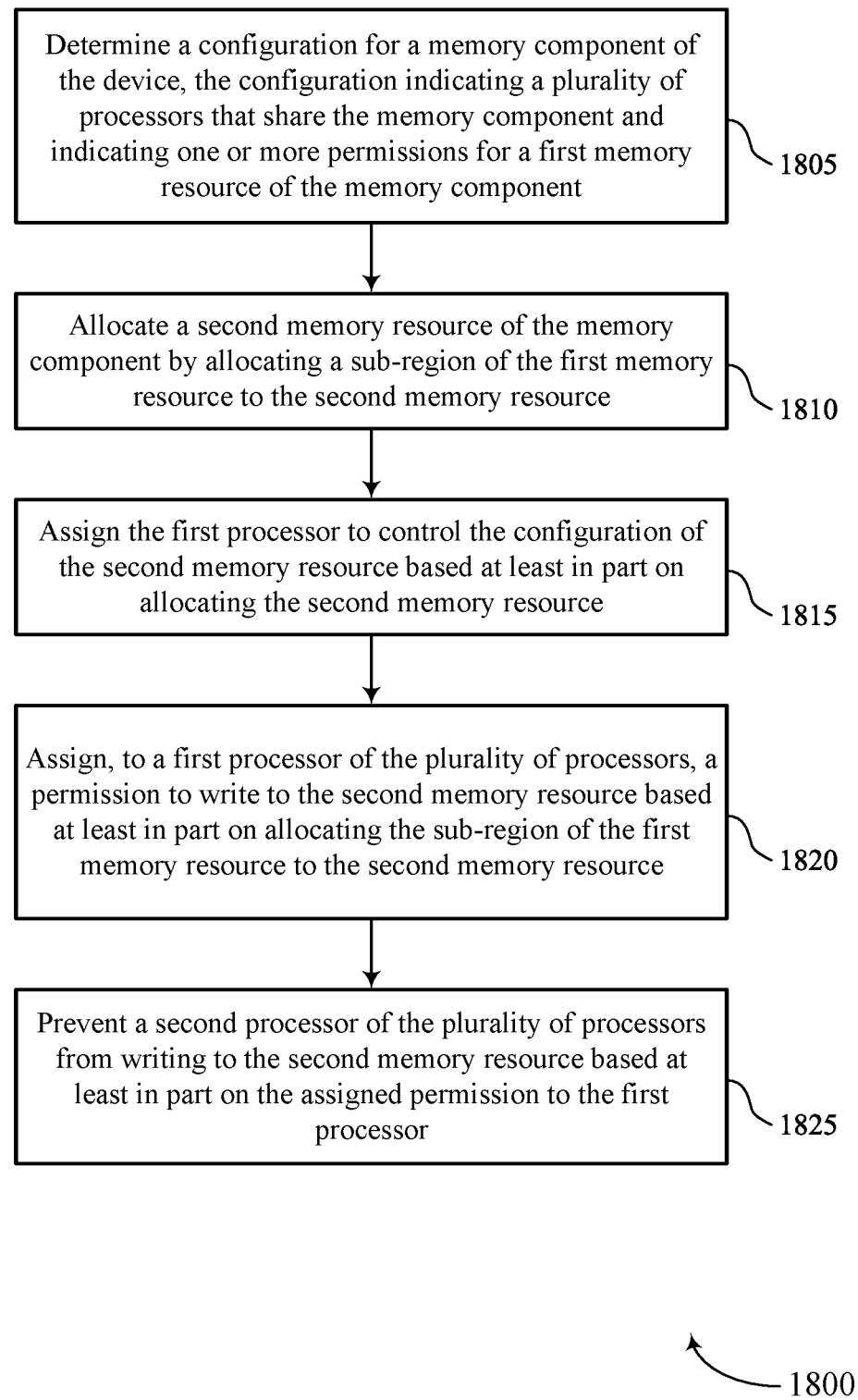

FIG. 18 shows a flowchart illustrating a method 1800 that supports access control configurations for shared memory in accordance with aspects of the present disclosure. The operations of the method 1800 may be implemented by a device or its components as described herein. For example, the operations of the method 1800 may be performed by a device as described with reference to FIGS. 1 through 16. In some examples, a device may execute a set of instructions to control the functional elements of the device to perform the described functions. Additionally or alternatively, the device may perform aspects of the described functions using special-purpose hardware.

At 1805, the method may include determining a configuration for a memory component of the device, the configuration indicating a set of multiple processors that share the memory component and indicating one or more permissions for a first memory resource of the memory component. The operations of 1805 may be performed in accordance with examples as disclosed herein. In some examples, aspects of the operations of 1805 may be performed by a memory configuration component 1525 as described with reference to FIG. 15.

At 1810, the method may include allocating a second memory resource of the memory component by allocating a sub-region of the first memory resource to the second memory resource. The operations of 1810 may be performed in accordance with examples as disclosed herein. In some examples, aspects of the operations of 1810 may be performed by a memory resource allocation component 1530 as described with reference to FIG. 15.

At 1815, the method may include assigning the first processor to control the configuration of the second memory resource based on allocating the second memory resource. The operations of 1815 may be performed in accordance with examples as disclosed herein. In some examples, aspects of the operations of 1815 may be performed by a memory configuration component 1525 as described with reference to FIG. 15.

At 1820, the method may include assigning, to a first processor of the set of multiple processors, a permission to write to the second memory resource based on allocating the sub-region of the first memory resource to the second memory resource. The operations of 1820 may be performed in accordance with examples as disclosed herein. In some examples, aspects of the operations of 1820 may be performed by a permission assignation component 1535 as described with reference to FIG. 15.

At 1825, the method may include preventing a second processor of the set of multiple processors from writing to the second memory resource based on the assigned permission to the first processor. The operations of 1825 may be performed in accordance with examples as disclosed herein. In some examples, aspects of the operations of 1825 may be performed by a shared memory writing component 1540 as described with reference to FIG. 15.

Figure 19:
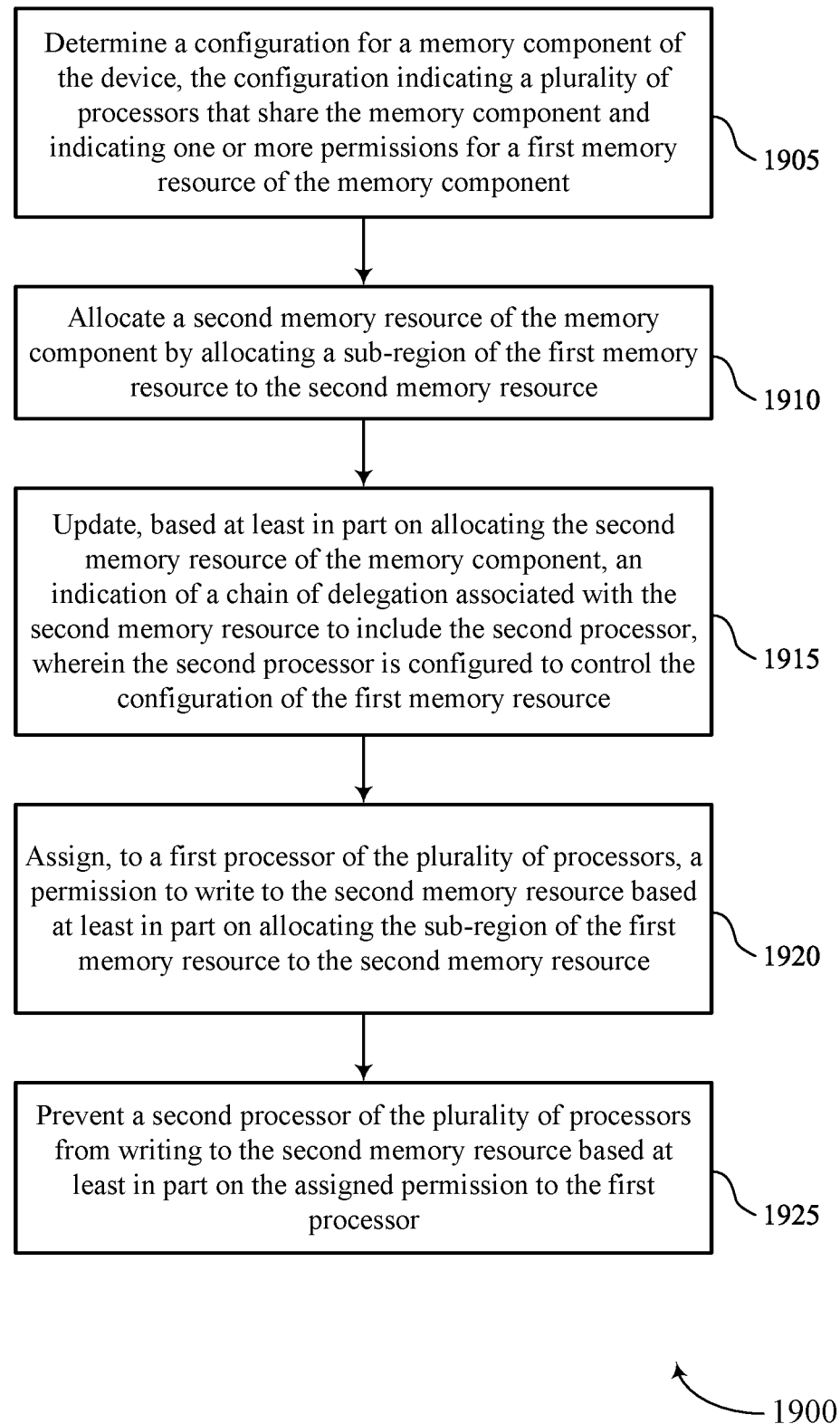

FIG. 19 shows a flowchart illustrating a method 1900 that supports access control configurations for shared memory in accordance with aspects of the present disclosure. The operations of the method 1900 may be implemented by a device or its components as described herein. For example, the operations of the method 1900 may be performed by a device as described with reference to FIGS. 1 through 16. In some examples, a device may execute a set of instructions to control the functional elements of the device to perform the described functions. Additionally or alternatively, the device may perform aspects of the described functions using special-purpose hardware.

At 1905, the method may include determining a configuration for a memory component of the device, the configuration indicating a set of multiple processors that share the memory component and indicating one or more permissions for a first memory resource of the memory component. The operations of 1905 may be performed in accordance with examples as disclosed herein. In some examples, aspects of the operations of 1905 may be performed by a memory configuration component 1525 as described with reference to FIG. 15.

At 1910, the method may include allocating a second memory resource of the memory component by allocating a sub-region of the first memory resource to the second memory resource. The operations of 1910 may be performed in accordance with examples as disclosed herein. In some examples, aspects of the operations of 1910 may be performed by a memory resource allocation component 1530 as described with reference to FIG. 15.

At 1915, the method may include updating, based on allocating the second memory resource of the memory component, an indication of a chain of delegation associated with the second memory resource to include the second processor, where the second processor is configured to control the configuration of the first memory resource. The operations of 1915 may be performed in accordance with examples as disclosed herein. In some examples, aspects of the operations of 1915 may be performed by a memory configuration component 1525 as described with reference to FIG. 15.

At 1920, the method may include assigning, to a first processor of the set of multiple processors, a permission to write to the second memory resource based on allocating the sub-region of the first memory resource to the second memory resource. The operations of 1920 may be performed in accordance with examples as disclosed herein. In some examples, aspects of the operations of 1920 may be performed by a permission assignation component 1535 as described with reference to FIG. 15.

At 1925, the method may include preventing a second processor of the set of multiple processors from writing to the second memory resource based on the assigned permission to the first processor. The operations of 1925 may be performed in accordance with examples as disclosed herein. In some examples, aspects of the operations of 1925 may be performed by a shared memory writing component 1540 as described with reference to FIG. 15.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for memory management at a wireless communication device, comprising:
   determining a configuration for a memory component of the wireless communication device, the configuration indicating a plurality of processors that share the memory component and indicating one or more permissions for a first memory resource of the memory component;
   allocating a second memory resource of the memory component by allocating a sub-region of the first memory resource to the second memory resource, wherein the second memory resource is writable by the plurality of processors;
   assigning, to a first processor of the plurality of processors, a permission to write to the second memory resource based at least in part on allocating the sub-region of the first memory resource to the second memory resource; and
   preventing a second processor of the plurality of processors from writing to the second memory resource based at least in part on the assigned permission to the first processor.

2. The method of claim 1, further comprising:
   assigning the first processor to control the configuration of the second memory resource based at least in part on allocating the second memory resource.

3. The method of claim 1, further comprising:
   updating, based at least in part on allocating the second memory resource of the memory component, an indication of a chain of delegation associated with the second memory resource to include the second processor, wherein the second processor is configured to control the configuration of the first memory resource.

4. The method of claim 1, further comprising:
   writing first information to the second memory resource by the first processor based at least in part on the assigned permission to the first processor.

5. The method of claim 4, further comprising:
   reading the first information from the second memory resource by the second processor based at least in part on writing the first information to the second memory resource by the first processor.

6. The method of claim 1, further comprising:
   updating, based at least in part on allocating the second memory resource of the memory component, a data structure associated with the configuration of the memory component to include a second plurality of fields associated with the second memory resource, the data structure further comprising a first plurality of fields associated with the first memory resource.

7. The method of claim 6, further comprising:
   reading, by the first processor, a value indicative of the assigned permission to write to the second memory resource from a first field of the second plurality of fields associated with the second memory resource.

8. The method of claim 6, wherein:
   the second plurality of fields comprises respective fields indicating an address range of the second memory resource, read permissions for the second memory resource, the assigned permission to write to the second memory resource, a parent memory resource for the second memory resource, and a chain of delegation for the second memory resource; and
   the first plurality of fields comprises respective fields indicating an address range of the first memory resource, read permissions for the first memory resource, a permission to write to the first memory resource, and a chain of delegation for the first memory resource.

9. The method of claim 1, further comprising:
   assigning, to the second processor, the assigned permission to write to the second memory resource; and
   preventing the first processor from writing to the second memory resource based at least in part on the assigned permission to the second processor.

10. The method of claim 9, further comprising:
    updating an indication of a chain of delegation associated with the second memory resource to include the first processor based at least in part on the assigned permission to write to the second memory resource to the second processor.

11. The method of claim 9, further comprising:
    writing, to the second memory resource and by the second processor, second information based at least in part on the assigned permission to the second processor.

12. The method of claim 9, further comprising:
    assigning, by the second processor to a third processor of the plurality of processors, the assigned permission to write to the second memory resource;
    preventing the first processor and the second processor from writing to the second memory resource based at least in part on the assigned permission to the third processor; and
    updating an indication of a chain of delegation associated with the second memory resource to indicate the second processor based at least in part on the assigned permission to write to the second memory resource to the third processor.

13. A wireless communication device for memory management, comprising:
    one or more memories, the one or more memories comprising a memory component, and at least one memory of the one or more memories storing processor-executable code; and
    a plurality of processors coupled with the one or more memories and individually or collectively operable to execute the code to cause the wireless communication device to:
    determine a configuration for the memory component, the configuration indicating that the plurality of processors share the memory component and indicating one or more permissions for a first memory resource of the memory component;
    allocate a second memory resource of the memory component by allocating a sub-region of the first memory resource to the second memory resource, wherein the second memory resource is writable by the plurality of processors;
    assign, to a first processor of the plurality of processors, a permission to write to the second memory resource based at least in part on allocating the sub-region of the first memory resource to the second memory resource; and
    prevent a second processor of the plurality of processors from writing to the second memory resource based at least in part on the assigned permission to the first processor.

14. The wireless communication device of claim 13, wherein the plurality of processors are individually or collectively further operable to cause the wireless communication device to:

assign the first processor to control the configuration of the second memory resource based at least in part on allocating the second memory resource of the memory component.

15. The wireless communication device of claim 13, wherein the plurality of processors are individually or collectively further operable to cause the wireless communication device to:

update, based at least in part on allocating the second memory resource of the memory component, an indication of a chain of delegation associated with the second memory resource to include the second processor, wherein the second processor is configured to control the configuration of the first memory resource.

16. The wireless communication device of claim 13, wherein the plurality of processors are individually or collectively further operable to cause the wireless communication device to:

write first information to the second memory resource by the first processor based at least in part on the assigned permission to the first processor.

17. The wireless communication device of claim 13, wherein the plurality of processors are individually or collectively further operable to cause the wireless communication device to:

update, based at least in part on allocating the second memory resource of the memory component, a data structure associated with the configuration of the memory component to include a second plurality of fields associated with the second memory resource, the data structure further comprising a first plurality of fields associated with the first memory resource.

18. The wireless communication device of claim 13, wherein the plurality of processors are individually or collectively further operable to cause the wireless communication device to:

assign, to the second processor, the assigned permission to write to the second memory resource;
prevent the first processor from writing to the second memory resource based at least in part on the assigned permission to the second processor; and
update an indication of a chain of delegation associated with the second memory resource to include the first processor based at least in part on the assigned permission to write to the second memory resource to the second processor.

19. The wireless communication device of claim 18, wherein the plurality of processors are individually or collectively further operable to cause the wireless communication device to:

assign, by the second processor to a third processor of the plurality of processors, the assigned permission to write to the second memory resource;
prevent the first processor and the second processor from writing to the second memory resource based at least in part on the assigned permission to the third processor; and
update the indication of the chain of delegation associated with the second memory resource to indicate the second processor based at least in part on the assigned permission to write to the second memory resource to the third processor.

20. A wireless communication device for memory management, comprising:

means for determining a configuration for a memory component of the wireless communication device, the configuration indicating a plurality of processors that share the memory component and indicating one or more permissions for a first memory resource of the memory component;
means for allocating a second memory resource of the memory component by allocating a sub-region of the first memory resource to the second memory resource, wherein the second memory resource is writable by the plurality of processors;
means for assigning, to a first processor of the plurality of processors, a permission to write to the second memory resource based at least in part on allocating the sub-region of the first memory resource to the second memory resource; and
means for preventing a second processor of the plurality of processors from writing to the second memory resource based at least in part on the assigned permission to the first processor.

* * * * *